United States Patent
Demizu et al.

(10) Patent No.: US 8,041,544 B2
(45) Date of Patent: Oct. 18, 2011

(54) SUPPORT DEVICE, METHOD, AND STORAGE MEDIUM USED TO DESIGN A PART IN STRING OR BELT FORM

(75) Inventors: Kouji Demizu, Kawasaki (JP); Masayuki Kidera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 12/639,030

(22) Filed: Dec. 16, 2009

(65) Prior Publication Data
US 2010/0094599 A1    Apr. 15, 2010

Related U.S. Application Data

(63) Continuation of application No. PCT/JP2007/000695, filed on Jun. 26, 2007.

(51) Int. Cl.
*G06F 17/50* (2006.01)
(52) U.S. Cl. .......................................... 703/1
(58) Field of Classification Search .................. 703/1
See application file for complete search history.

(56) References Cited

U.S. PATENT DOCUMENTS

| | | | |
|---|---|---|---|
| 6,842,173 B2 | 1/2005 | Sakakura et al. | |
| 6,970,755 B2 | 11/2005 | Sakakura et al. | |
| 7,206,723 B2 | 4/2007 | Sawai et al. | |
| 7,383,162 B2 * | 6/2008 | Hashima et al. | 703/2 |
| 7,529,638 B2 * | 5/2009 | Sawai et al. | 702/150 |
| 2004/0019399 A1 | 1/2004 | Kabasawa | |
| 2005/0240383 A1 | 10/2005 | Hashima et al. | |

FOREIGN PATENT DOCUMENTS

| | | |
|---|---|---|
| JP | 7-92905 | 4/1995 |
| JP | 2003-141197 | 5/2003 |
| JP | 2004-46815 | 2/2004 |
| JP | 2004-139568 | 5/2004 |
| JP | 2004-362191 | 12/2004 |
| WO | 2004/104868 | 12/2004 |
| WO | 2008/084534 | 7/2008 |
| WO | 2008/084535 | 7/2008 |

OTHER PUBLICATIONS

International Search Report for PCT/JP2007/000695, mailed Jul. 31, 2007.*

* cited by examiner

*Primary Examiner* — Paul Rodriguez
*Assistant Examiner* — Eun Kim
(74) *Attorney, Agent, or Firm* — Fujitsu Patent Center

(57) ABSTRACT

A design support device used to design a part in string or belt form, including: a part editing unit configured to edit a part by changing a position of a pass point through which the part passes; and a section comparison unit configured to compare a section having a plurality of consecutive pass points before the edition by the part editing unit with the sections after the edition by the part editing unit, and extracting the section in which relative positions or relative passing directions are different between two pass points in the sections.

7 Claims, 24 Drawing Sheets

| SECTION | BEFORE CHANGE | STARTING POINT PASS POINT | END POINT PASS POINT | RELATIVE POSITION X, Y, Z | RELATIVE PASSING DIRECTION Rx, Ry, Rz | DIFFERENCE FROM GRAVITATIONAL FORCE DIRECTION Rx, Ry, Rz |
|---|---|---|---|---|---|---|
| 2 | BEFORE | PASS POINT P2 | PASS POINT P3 | 25, -5, 0 | 0.86, 0.52, 0 | 0.5, -0.85, 0 |
| | AFTER | PASS POINT P2 | PASS POINT P3 (P3') | 25, 20, 0 | 0.86, 0.52, 0 | 0.5, -0.85, 0 |

FIG. 5B

| SECTION | BEFORE CHANGE | STARTING POINT PASS POINT | END POINT PASS POINT | RELATIVE POSITION X,Y,Z | RELATIVE PASSING DIRECTION Rx,Ry,Rz | DIFFERENCE FROM GRAVITATIONAL FORCE DIRECTION Rx,Ry,Rz |
|---|---|---|---|---|---|---|
| 2 | BEFORE | PASS POINT P2 | PASS POINT P3 | 25,-5,0 | 0.86, 0.52, 0 | 0.5, -0.85, 0 |
|   | AFTER | PASS POINT P2 | PASS POINT P3 (P3') | 25,-5,0 | 0.52, 0.86, 0 | 0.5, -0.85, 0 |

F I G. 6 B

| SECTION | BEFORE CHANGE | STARTING POINT PASS POINT | END POINT PASS POINT | RELATIVE POSITION X,Y,Z | RELATIVE PASSING DIRECTION Rx,Ry,Rz | DIFFERENCE FROM GRAVITATIONAL FORCE DIRECTION Rx,Ry,Rz |
|---|---|---|---|---|---|---|
| 2 | BEFORE | PASS POINT P2 | PASS POINT P3 | 25,-5,,0 | 0.86,0.52,0 | 0.5,-0.85,0 |
| | AFTER | PASS POINT P2 | PASS POINT P3 (P3') | 25,-5,0 | 0.86,0.52,0 | 0.0,-1.0,0 |

FIG. 7B

SECTION SHAPE MANAGEMENT TABLE 106a
| SECTION | 1 | 2 | 3 |
|---|---|---|---|
| STARTING POINT PASS POINT | PASS POINT P1 | PASS POINT P2 | PASS POINT P3 |
| SHAPE | 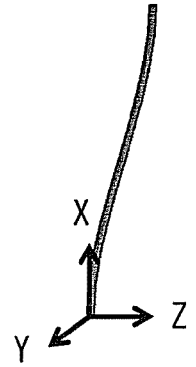 | 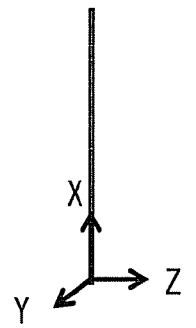 | 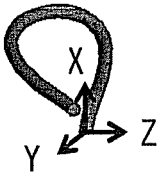 |
FIG. 9A

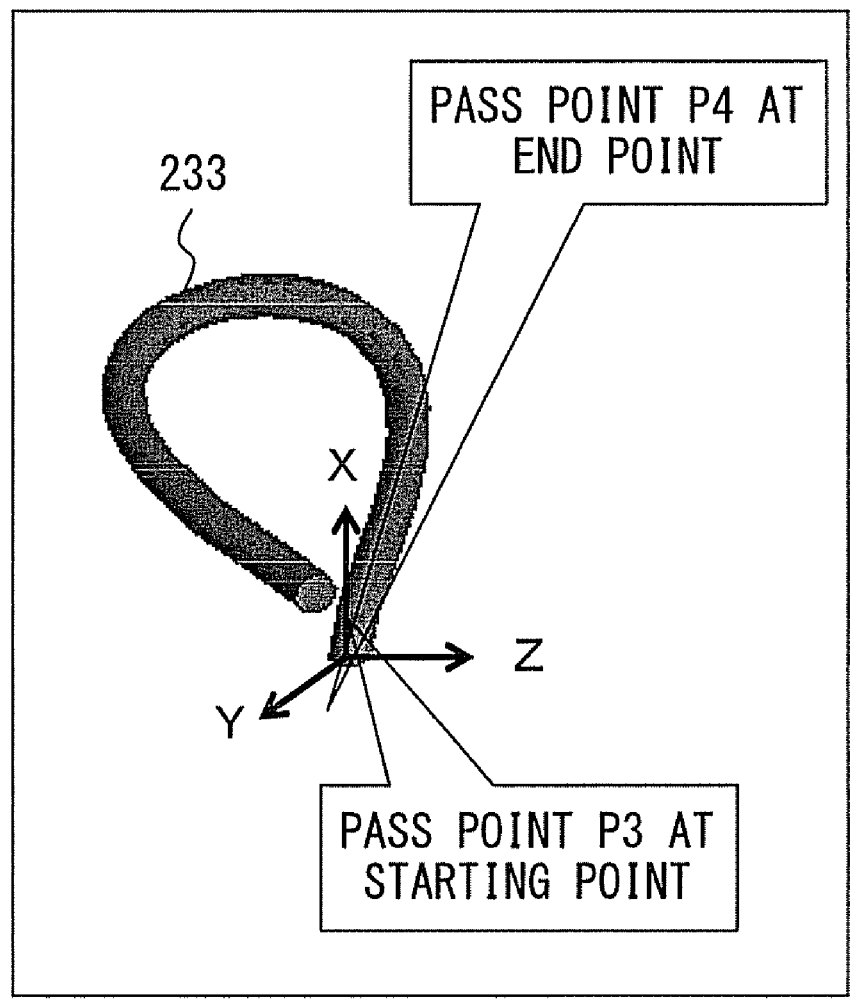
F I G. 9 B

101a

| SECTION | GRAVITATIONAL CONSIDERATION FLAG |
|---|---|
| SECTION 1 | SET |
| SECTION 2 | SET |
| SECTION 3 | RELEASED |
| SECTION n | SET |

FIG. 10B

GENERATED HARNESS

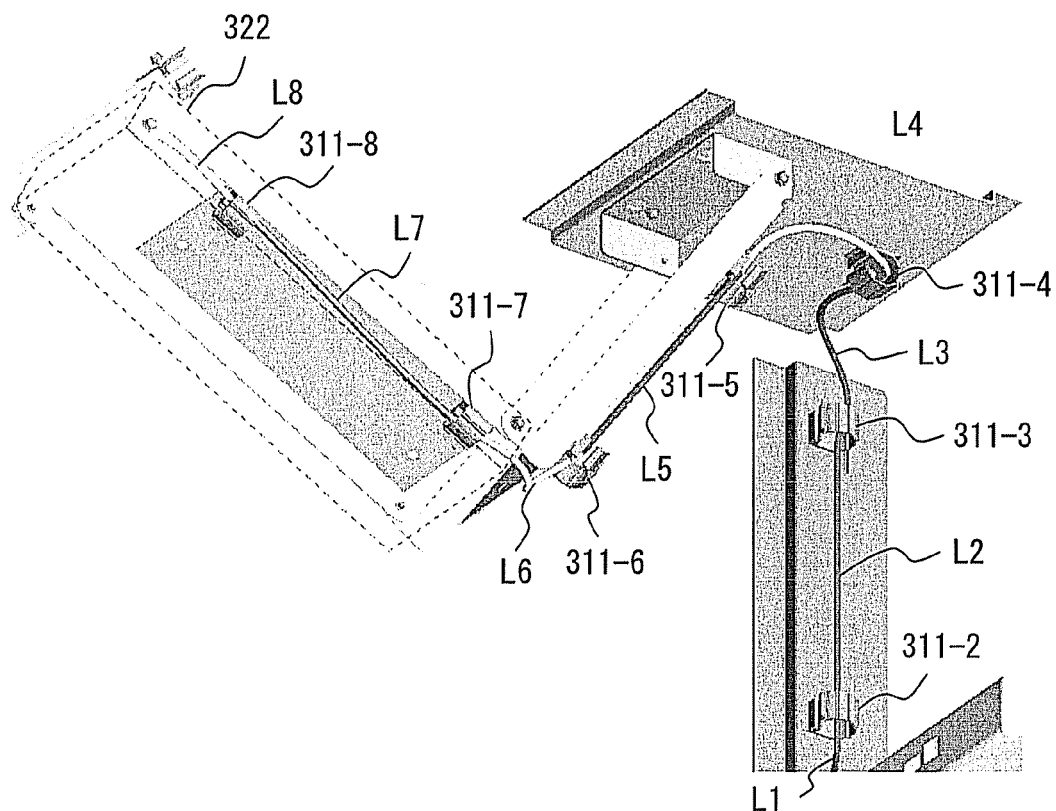
EXAMPLE OF HIGHLIGHT DISPLAY (DISPLAY COLOR) OF CHANGED SECTION
F I G. 1 4 A

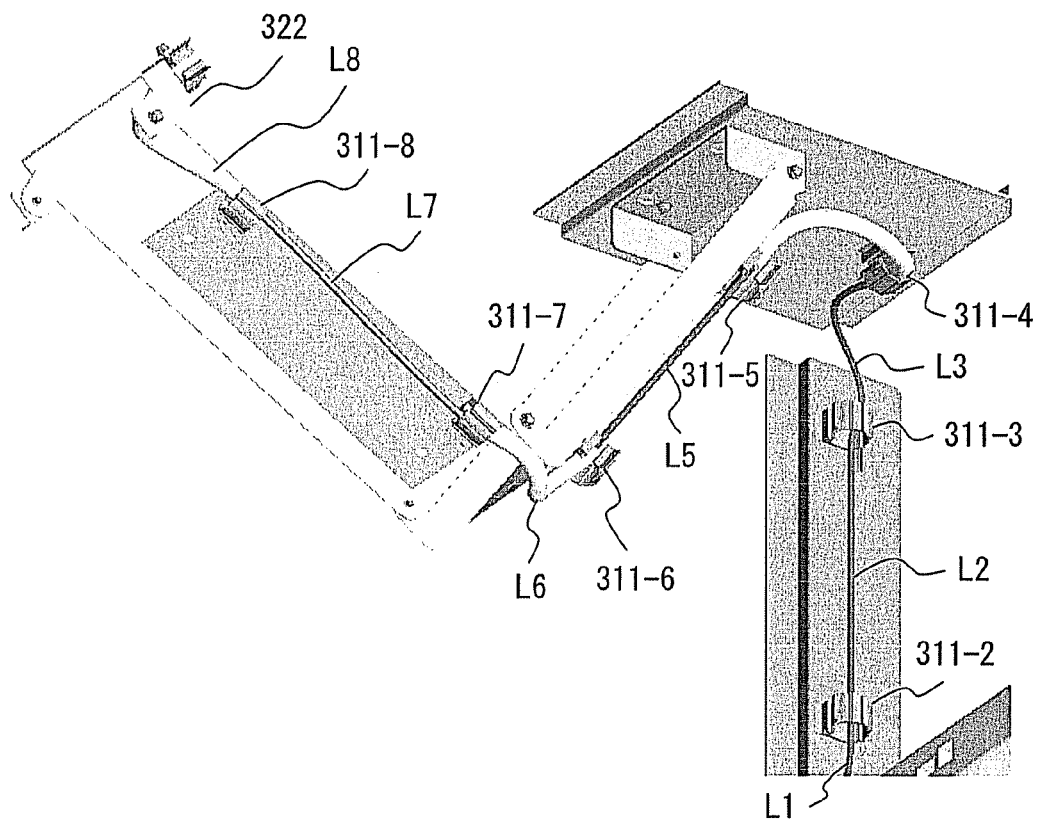
EXAMPLE OF HIGHLIGHT DISPLAY (SHAPE CHANGE) OF CHANGED SECTION
F I G. 1 4 B

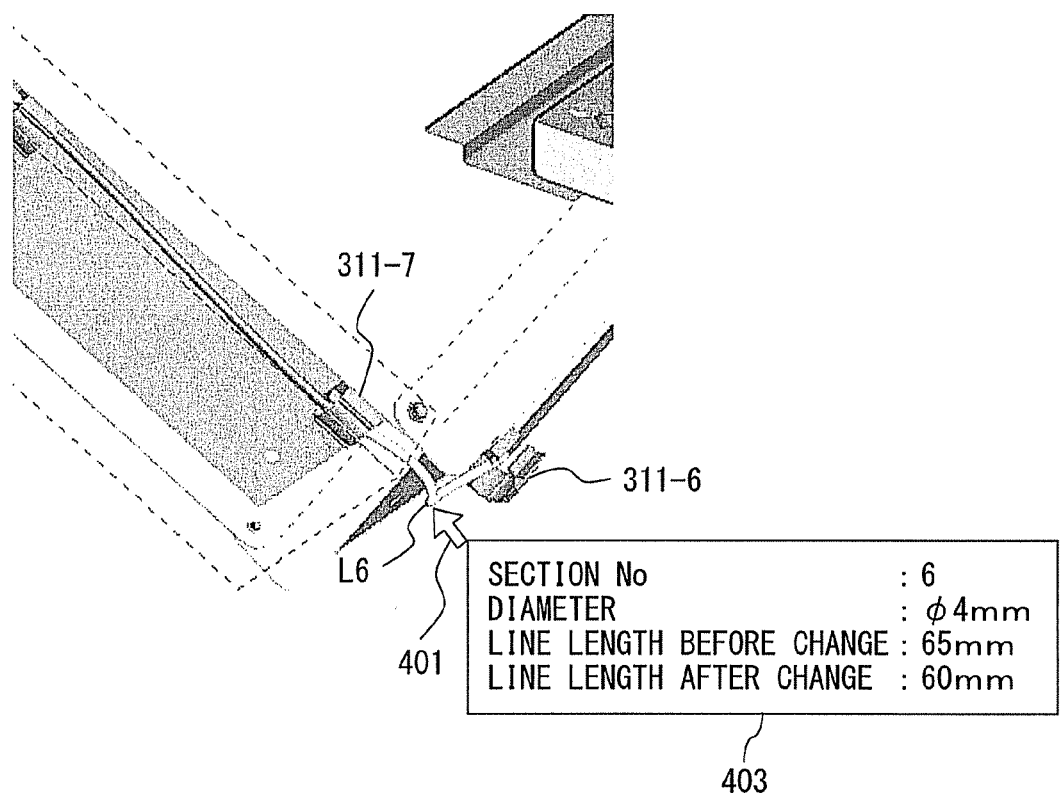
F I G. 15

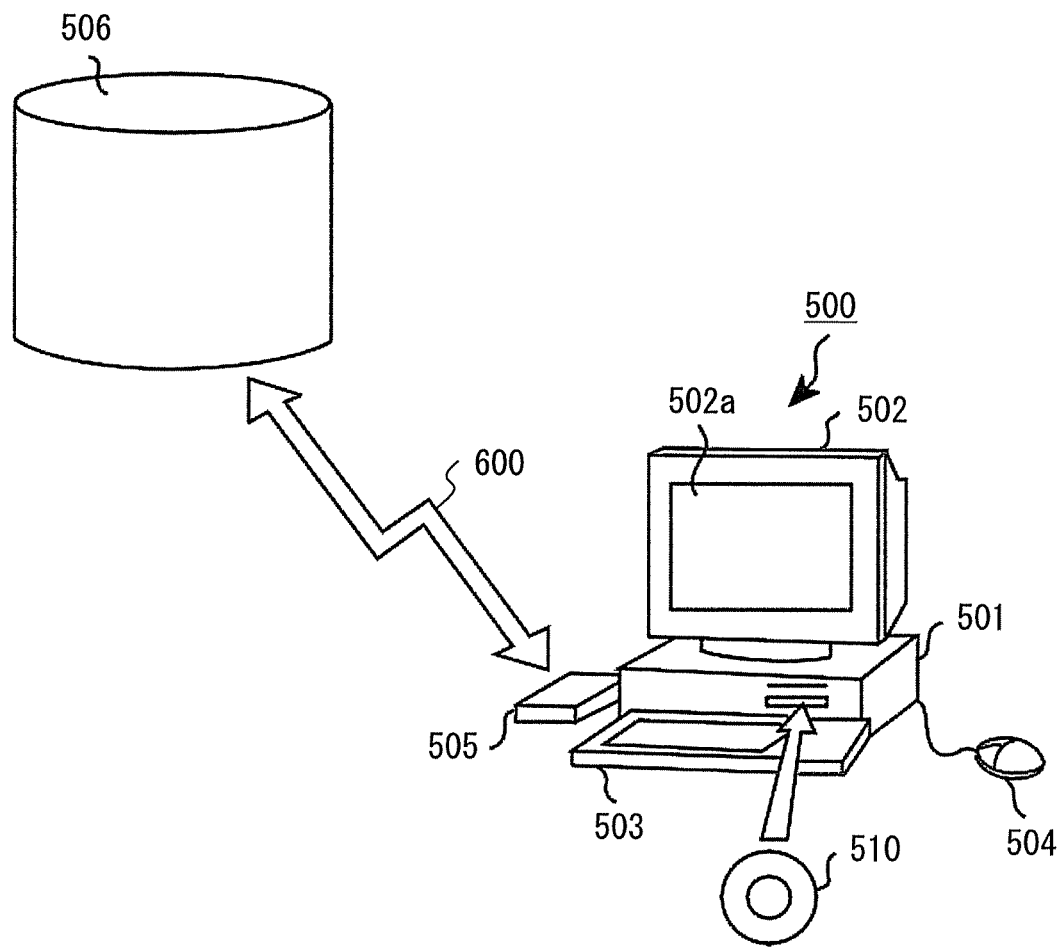
F I G. 16

SUPPORT DEVICE, METHOD, AND STORAGE MEDIUM USED TO DESIGN A PART IN STRING OR BELT FORM

CROSS-REFERENCE TO RELATED APPLICATION

This application is a continuation of PCT application PCT/JP2007/000695 filed on Jun. 26, 2007.

FIELD

The embodiments discussed herein are related to a design support device for supporting the shape design of flexible parts, members, etc.

BACKGROUND

Recently, three-dimensional data is widely prepared in CAD (computer aided design) technology as a design support device for equipment, and the equipment can be designed, operation-verified, etc. in a three-dimensional virtual space. Thus, the verification previously performed by manufacturing a prototype can be performed in a designing stage of a product using product data arranged in the virtual space, thereby enabling a product to be developed in a short period.

An electronic part in electronic equipment is electrically connected by a harness (wire harness), a cable, etc. In the connection wiring of an electric signal using the harness, the cable, etc., there is the increasing need for preliminary verification from a design stage. Since a harness, a cable, etc. are flexible objects and light in weight, their wiring routes are curve-shaped in many cases.

When a designing operation is performed by arranging a harness, a cable, etc. in a virtual space, their routes are first defined as curves, and then the shapes of the harness and the cable are drawn with the curves centered.

In this case, the curves of the routes are divided by the starting point, the end point, and their pass points, and defined as the curves connecting the points. The starting point, the end point, and each pass point are managed by the "pass point information" including "position coordinates" and a "pass direction". The pass direction indicates the tangent direction of the curve passing the pass point, and is defined as a vector (passing vector). The coordinate system set in the virtual space is roughly classified into an "absolute coordinate system" and a "relative coordinate system". One absolute coordinate system is defined in a virtual space, and a relative coordinate system is set for each pass point. The pass points in this case include the starting points and the end points of the routes of a harness and a cable. In the description below, the term "pass point" includes the starting point and the end point.

Described below is a conventional shape generating method for a harness and a cable in a virtual space. In the following description, a harness and a cable are generally represented by the term of a "flexible object" for convenience.

{First Conventional Flexible Object Shape Generating Method}

FIG. 1 illustrates a first conventional method for generating the shape of a flexible object in a virtual space.

In this method, as illustrated in FIG. 1, the distance between a starting point 11 of a flexible object 10 and an end point 12 is divided into a plurality of sections (five sections in this example), and a flexible object in each section is treated as a model 13 of a predetermined shape such as a cylinder, a rectangle, etc. By arranging the model 13 in each section, the shape of a flexible object is expressed. Since the flexible object is generally curved, its center line is a curve 14. Therefore, the shape of the curve 14 is first determined, then the curve 14 is appropriately divided into a plurality of sections, and a cylindrical or rectangular model 13 is arranged in each section, thereby generating the shape of the flexible object.

The merit of this method is that a change in position or shape of a flexible object can be processed only by changing the coordinates of each model unless there is a change in wire length between the starting point and the end point. That is, since the model of each section before the change can be used as is, it is not necessary to change the model, and the arrangement or the shape of the flexible object can be processed in a high speed.

The demerits of this method are listed below.

When the wire length between the starting point and the endpoint is changed, the section before the change cannot be used as is. Therefore, it is necessary to regenerate the model.

Since the shape of each section is only substituted by a model of a fixed shape such as a cylinder, a rectangle, etc., the shape is different from the actual shape of a flexible object.

Although a natural shape approximate to a real object by dividing the distance between the starting point and the end point, the processing time increases by increasing the number of sections.

When the shapes into which an original flexible object is divided are variable, the section of a large shape cannot conform to a large curvature.

{Second Conventional Flexible Object Shape Generating Method}

FIG. 2 illustrates a second conventional method for generating the shape of a flexible object in a virtual space.

In this method, as illustrated in FIG. 2, a point is set in a curved portion 24 of the section between a starting point 21 of a flexible object 20 and an end point 22, and the points are connected by a straight line (approximately straight line) 25. In this case, the length of the straight line 25 is set as having a predetermined length or less, and the curved portion 24 is approximated by a plurality of short straight lines 25. Next, a cross-sectional shape 26 is formed with respect to each point, the shape of each cross-sectional shape 26 is connected to that of the adjacent point, thereby generating a model using the curve connecting the starting point 21 to the end point 22 as one model.

The merit of the second conventional method is that the shape of a real object can be correctly represented because the cross-sectional shape of a portion having a large curvature can be minutely obtained.

On the other hand, the demerits of the method are listed below.

Since it is necessary to regenerate the shape after changing a curve, a long changing time is required.

Since a flexible object is managed using one model, it is necessary to change the curve and the shape of the entire flexible object each time the curve is changed.

A part of a general structure is regarded as one rigid object, and after the first shape generation, the entire shape is moved or rotated to represent the shape in a three-dimensional virtual space. On the other hand, since the shape of a flexible object such as a harness, a cable, etc. changes depending on the mode of the arrangement of a part in a device, etc., the passing route of a part changes as the part moves and rotates. Therefore, each time a part moves or rotates, it is necessary to recalculate the curve of the route and regenerate the shape of a string, a belt, etc.

Therefore, there are the following problems with the method.

When the route of a flexible object (a harness, a cable, etc.) is changed, it is necessary to recalculate the curve and the shape of the entire harness with the change in the shape of the harness. Accordingly, the computer requires a large capability to perform calculations to dynamically generate the curve and the shape of a flexible object and display them in real time when the route of the flexible object is changed.

Even when there is a change only at one portion of the route of a flexible object, the curve is to be regenerated on the entire route. Therefore, when the route of the harness is changed, the changed portion cannot be easily detected.

Patent Document 1: PCT/JP2007/50187
Patent Document 2: PCT/JP2007/50189

SUMMARY

The design support device according to an aspect of the invention is to design a part in string or belt form.

The first aspect of the design support device according to the invention includes: a part editing unit configured to edit a part by changing the position of a pass point through which the part passes; and a section comparison unit configured to compare a section having a plurality of consecutive pass points before the edition by the part editing unit with the sections after the edition by the part editing unit, and extracting the section in which the relative positions or the relative passing directions are different between two pass points in the sections.

In the first aspect of the design support device according to the invention, when a pass point of a part in string or belt form is changed, the part is edited. On the basis of the edition result, a section having a changed point in relative position or relative passing direction after the change is extracted. Thus, for example, a section in which a shape has been changed can be extracted using the relative coordinate system etc. set in each section.

The second aspect of the design support device according to the invention is based on the first aspect of the design support device according to the present invention. By comparing the sections, a section in which the tangent direction of the part shape and the gravitational force direction are different after the edition in at least one pass point of the section is extracted.

The second aspect of the design support device according to the invention extracts a section in which the tangent direction of a part shape and the gravitational force direction are different after the edition for each section. Thus, a section in which it is necessary to regenerate a shape due to a change of the position in an absolute contents system although the relative position and the relative passing direction are not changed can be extracted. The section for which a difference of the pass direction with respect to the gravitational force direction is considered can be, for example, specified. The specification is performed by, for example, a user.

The third aspect of the design support device according to the invention is based on the first or second aspect of the design support device according to the present invention, and further includes a shape generation unit configured to generate a shape in the section extracted by the section comparison unit and connect the shape to the shape of a section outside the extracted section.

According to the third aspect of the design support device of the invention, the shape of a section in which the shape is changed can be generated.

The fourth aspect of the design support device according to the invention is based on any of the first through third aspects, and further includes a display unit configured to change and display the display attribute of the section extracted by the section comparison unit.

According to the fourth aspect of the design support device of the invention, a section in which in which a shape is changed and a section in which a shape is not changed can be identified and displayed.

The fifth aspect of the design support device according to the invention is based on any of the first through fourth aspects, and further includes a change section display unit configured to display the information about the section extracted by the section comparison unit before a change and after the change.

According to the fifth aspect of the design support device of the invention, how a shape has been changed in a section in which the change has been detected can be grasped.

The design support method according to the present invention is to design a part in string or belt form.

The first aspect of the design support method according to the invention includes: editing a part by changing the position of a pass point through which the part passes; comparing a section having a plurality of consecutive pass points before the editing with the sections after the editing, and extracting the section in which the relative positions or the relative passing directions are different between two pass points in the sections.

In the comparing of the second aspect of the design support method according to the invention, a section in which the tangent direction of the part shape and the gravitational force direction are different after the edition in at least one pass point of the section is extracted.

The third aspect of the design support method according to the invention further includes generating a shape in the section extracted in the comparing, and connecting the shape to the shape of a section outside the extracted section.

The first aspect of the storage medium storing the program according to the invention directs a design support computer for designing a part in string or belt shape to perform the process including: editing a part by changing the position of a pass point through which the part passes; and comparing a section having a plurality of consecutive pass points before the editing with the sections after the editing, and extracting the section in which the relative positions or the relative passing directions are different between two pass points in the sections.

In the comparing of the second aspect of the storage medium according to the invention based on the first aspect of the storage medium according to the present invention, a section in which the tangent direction of the part shape and the gravitational force direction are different after the edition in at least one pass point of the section is extracted.

BRIEF DESCRIPTION OF DRAWINGS

FIG. 5B illustrates a change in relative position after the change of a section 2 illustrated in FIG. 5A;

FIG. 6B illustrates a change in relative passing direction after the change of a section 2 illustrated in FIG. 6A;

FIG. 7B illustrates a change in difference from the gravitational force direction after the change of a section 2 illustrated in FIG. 7A;

FIG. 9A is an example of a configuration of the section shape management table;

FIG. 9B illustrates in detail the section 3 stored in the section shape management table in FIG. 9A;

FIG. 10B is an example of a configuration of the gravitational consideration flag management table provided for the harness management unit;

FIG. 14A is an example of highlight display (highlight display by display color) of a harness displayed by the section shape display unit on the screen of a display device;

FIG. 14B is another example of highlight display (highlight display by shape) of a harness displayed by the section shape display unit on the screen of a display device;

FIG. 15 is an example of section information display displayed by the section shape display unit; and FIG. 16 illustrates an example of a configuration of a system of a computer executing the design support program according to an embodiment of the present invention;

DESCRIPTION OF EMBODIMENTS

The embodiments of the present invention are described below with reference to the attached drawings.

[Configuration]

{System Configuration}

Figure 1:
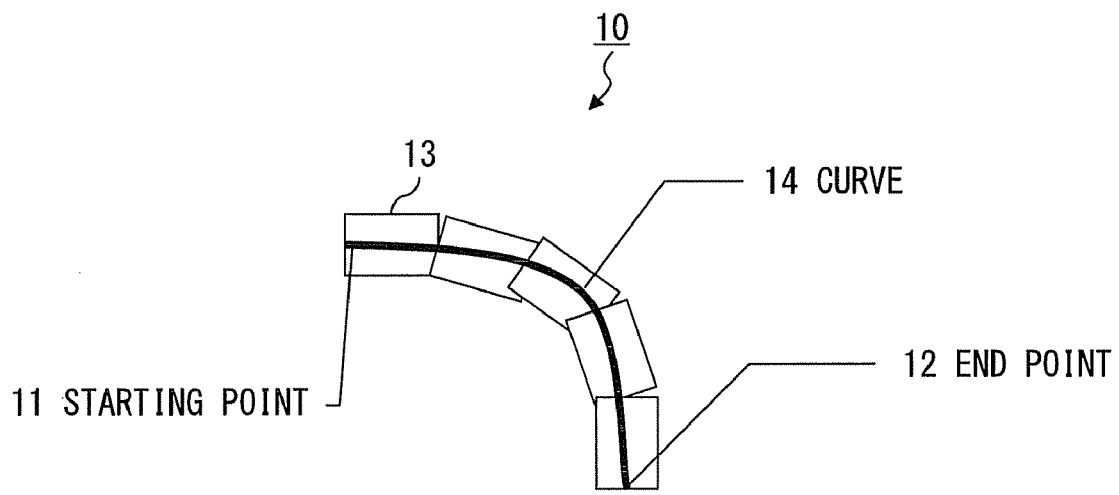
FIG. 1 illustrates the first conventional method for generating the shape of a flexible object in a virtual space.
Figure 2:
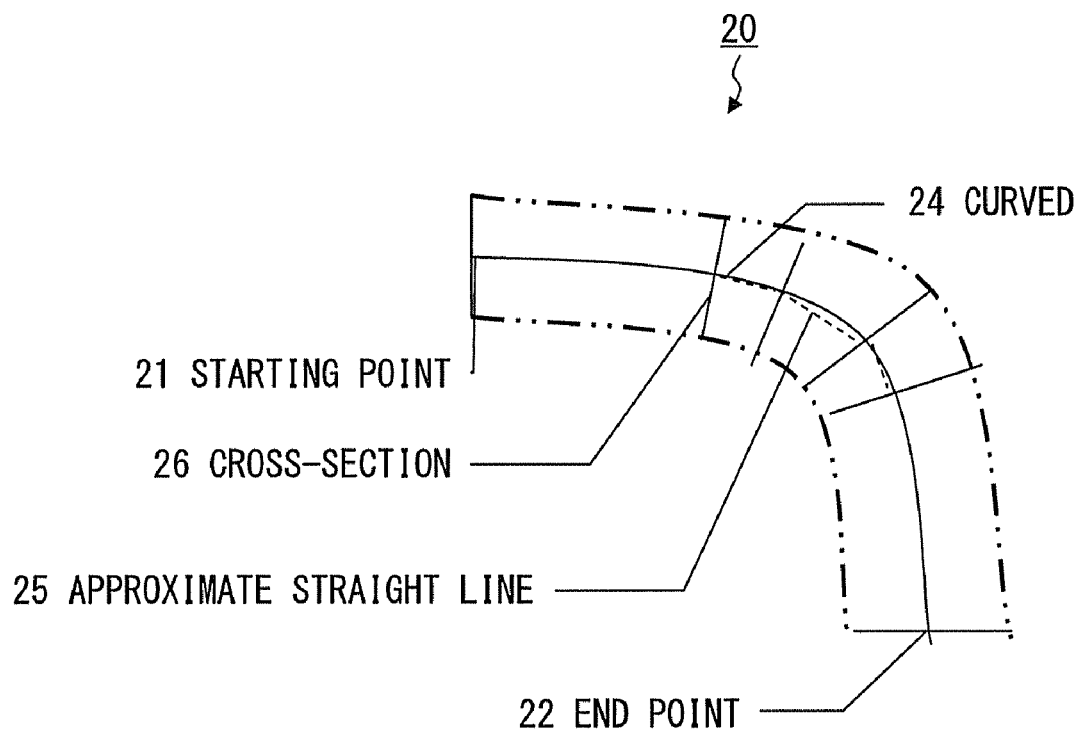
FIG. 2 illustrates the second conventional method for generating the shape of a flexible object in a virtual space.
Figure 3:
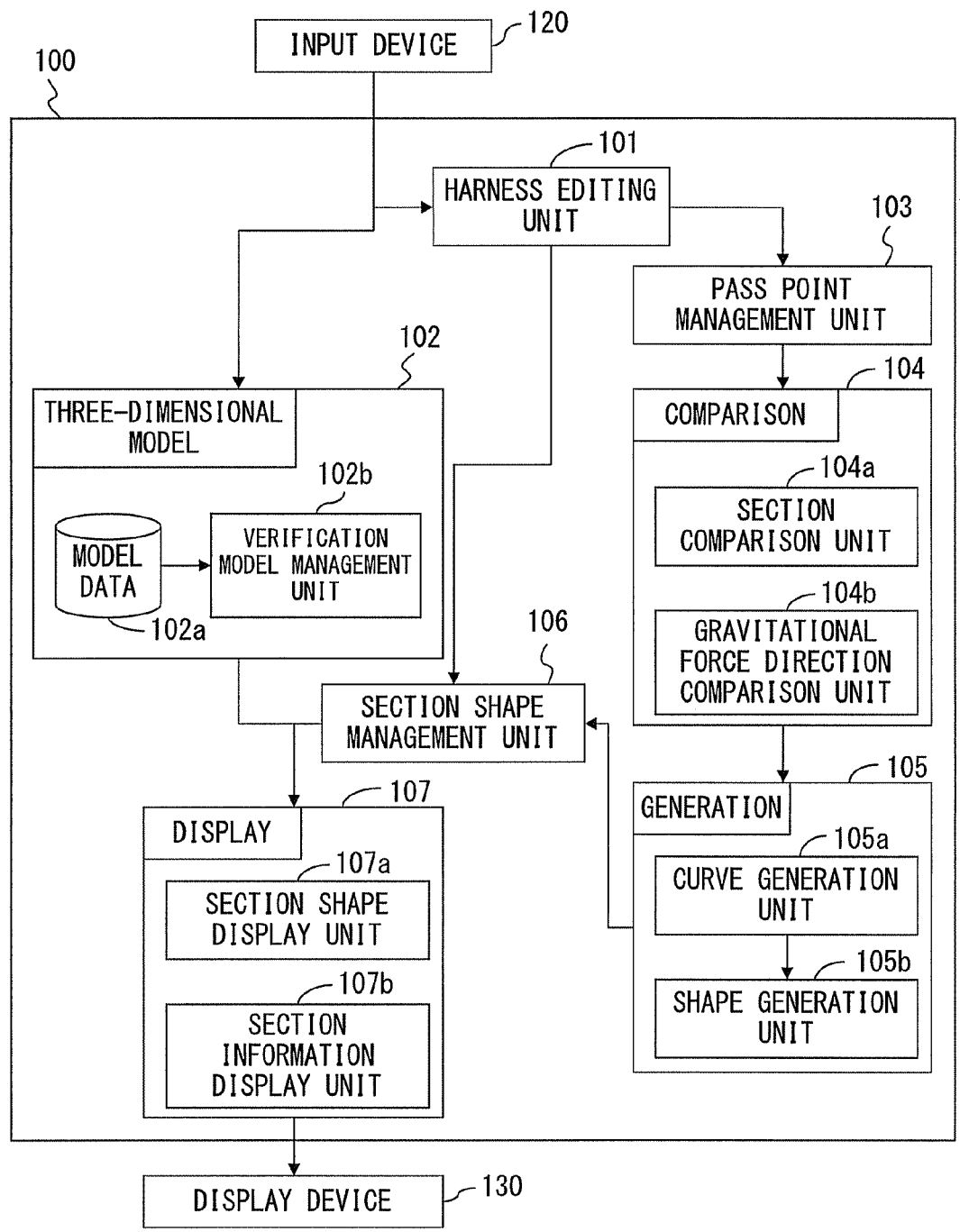
FIG. 3 illustrates the configuration of a system to which an embodiment of the design support device according to the present invention is applied.

FIG. 3 illustrates the configuration of a system to which an embodiment of the design support device according to the present invention is applied.

A design support device 100 in FIG. 3 is provided with a harness editing unit 101, a three-dimensional model management unit 102, a pass point management unit 103, a comparison unit 104, a generation unit 105, a section shape management unit 106, and a display unit 107.

The harness editing unit 101 edits and manages the information about the route design of each harness on the basis of user input from an input device 120. In the present embodiment, as described later, a "gravitational consideration flag" of a pass point specified by the user is set according to the pass point specification information from the input device 120. The gravitational consideration flag is set for the pass point at which a change is detected between the pass direction (pass direction vector) and the gravitational force direction (gravitational force direction vector) in the pass points specified by the user. The harness editing unit 101 also receives from the input device 120 the setting information etc. about the highlight shape of each section of the harness specified by the user through the input device 120, and manages the information.

The three-dimensional model management unit 102 manages the model data (three-dimensional model data of the part arranged in a virtual space) of a part implemented in a device to be designed. The three-dimensional model management unit 102 is provided with a model data database (model data DB) 102a and a verification model management unit 102b. The model data DB 102a is a database for storage and management of the model data of the above-mentioned part. The verification model management unit 102b manages the model data DB 102a, and registers and deletes the model data of each part. The pass point management unit 103 manages the information (about the position, the pass direction, the gravitational force direction, etc.) about the pass point of the route of each harness. Hereinafter, the information about the pass point is referred to as "pass point information".

When the pass point of a harness is changed, the comparison unit 104 acquires the pass point information about the harness from the pass point management unit 103, and detects a section in which the shape is to be changed about the harness. When a change of a section is detected, three types of parameters, that is, "relative position", "relative passing direction", and "gravitational force direction" are used. The comparison unit 104 is provided with a section comparison unit 104a and a gravitational force direction comparison unit 104b, and detects a section in which a shape change is required. The section comparison unit 104a detects a section in which a shape change is required by checking a change in relative position and relative passing direction of each section of the route of a harness. The gravitational force direction comparison unit 104b detects a section in which a shape change is required by checking a change in "gravitational force direction" of each section of the route of a harness. The definitions of the relative position, the relative passing direction, and the gravitational force direction, and the method of detecting a section in which a shape change is required are described later in detail. When a harness in which a shape change is required is detected, the comparison unit 104 notifies the generation unit 105 of the harness. In this case, it also notifies the generation unit 105 of the information about the section in which a shape change is required.

Upon receipt of the notification from the comparison unit 104, the generation unit 105 generates the shape of the route of the notified harness. The generation is performed only in a section in which a shape change is required (hereinafter referred to as a "shape regeneration section"). The generation of a shape in the shape regeneration section is performed in the above-mentioned conventional method. Therefore, first, the curve of the shape regeneration section is generated. Next, on the basis of the curve, the shape of the shape regeneration section is generated. The generation unit 105 is provided with a curve generation unit 105a and a shape generation unit 105b. The curve generation unit 105a generates the curve of the shape regeneration section. The shape generation unit 105b generates the shape of the shape regeneration section on the basis of the curve generated by the curve generation unit 105a. The generation unit 105 notifies the section shape management unit 106 of the information about the generated shape of the shape regeneration section (hereinafter referred to as shape regeneration section shape information). The shape regeneration section shape information includes the information about the wire lengths before and after the change of the shape regeneration section, etc. The generation unit 105 transmits the generated shape data of each section of the harness to the section shape management unit 106.

The section shape management unit 106 manages the information about the shape in each section of the harness on the basis of the management information acquired from the harness editing unit 101 and the shape data of each section of the harness received from the generation unit 105.

The display unit 107 acquires the shape information about the route of the harness from the section shape management unit 106, and generates the display data of the shape of the harness (hereinafter referred to as "harness shape display data"). The harness shape display data is displayed with the shape-changed section (hereinafter referred to as a "shape change section") discriminated from the shape-unchanged section. The display unit 107 also generates the display data of the change information about the shape change section (hereinafter referred to as "section information"). The display unit 107 is provided with a section shape display unit 107a and a section information display unit 107b. The section shape display unit 107a generates the harness shape display data. The section information display unit 107b generates the display data of the section information. The display unit 107 acquires the model data of a part from the three-dimensional model management unit 102, and arranges the model data in a virtual space in the arrangement position of the part, thereby generating the three-dimensional model display data of the inside of the device in which the part is arranged. By merging the three-dimensional model display data with the harness shape display data generated by the section shape display unit 107a, the display data of the three-dimensional model (three-dimensional model display data of the device to be designed) in which the part connected by the harness inside the device is generated.

The input device 120 and a display device 130 are connected to the design support device 100. The input device 120 inputs a command and data to the design support device 100, and is provided with a pointing device such as a keyboard, a mouse, etc. The user of the design support device 100 inputs necessary data (model data of a part), data of a harness, etc) for design of a device. When the route of a harness is changed, the change position of the pass point set in the route is specified through the input device 120.

The display device 130 displays a three-dimensional model of a device designed by the design support device 100, and is provided with a liquid display, a CRT display, etc. The display unit 107 of the design support device 100 outputs the three-dimensional model display data of the device to be designed, the harness shape display data, the display data of the section information, etc. When the above-mentioned data are input, the display device 130 displays the screen corresponding to the display data. The display device 130 also displays the user interface screen for input of an instruction and data by a user to the design support device 100.

{Definitions of Relative Position, Relative Passing Direction, and Gravitational Force Direction}

The definitions of the above-mentioned "relative position", "relative passing direction", and "gravitational force direction" are described below with reference to FIG. 4.

Figure 4:
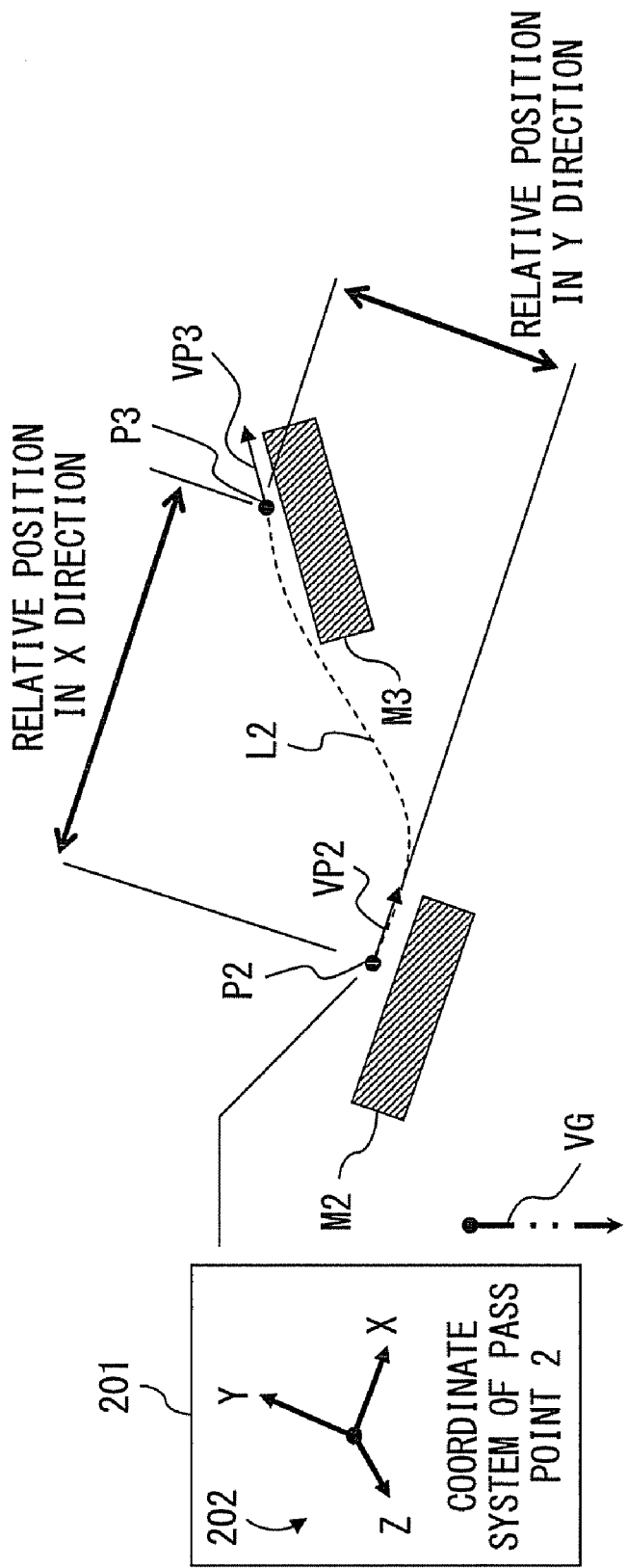
FIG. 4 is an explanatory view of the definition of the "relative position", "relative passing direction", and "gravitational force direction" used in an embodiment of the present invention.

In FIG. 4, the point P2 and the point P3 are pass points set on the curve of the harness, and the distance between the adjacent pass points P2 and P3 is defined as a section. The pass point P2 of the starting point in the section is defined as a starting point pass point, and the pass point P3 of the end point is defined as an end point pass point.

The curve L2 indicated by the broken line in FIG. 4 refers to the harness of the section (hereinafter referred to as a section 2) between the pass points P2 and P3. M2 and M3 are models of parts, and are, for example, clamping parts (hereinafter referred to as clamp parts). In this example, the pass points P2 and P3 are set in the positions in which they are separate from each other by a predetermined distance in the normal direction from the parts M2 and M3 respectively.

For the section 2, a relative coordinate system having the starting point pass point P2 is set as an origin. The relative coordinate system is a three-dimensional orthogonal coordinate system 202 enclosed by a rectangular frame 201 in FIG. 4. In the present embodiment, the positive direction of the X axis of the relative coordinate system 202 is set in the pass direction of the harness L2 at the starting point pass point P2. The pass direction of the starting point pass point P2 is represented by a three-dimensional vector (hereinafter referred to as a pass direction vector) VP2. The direction of the X axis of the relative coordinate system having the starting point pass point of the section as an origin is not limited to the pass direction of the starting point pass point. For example, the pass direction of the starting point pass point can be set on the Y axis of the relative coordinate system.

In the relative coordinate system 202 having the pass point P2 as an origin (0, 0, 0), the coordinates (x3, y3, z3) of the pass point P3 are determined. In this case, x3, y3, and z3 are respectively defined as the relative positions of the X direction (X-axis direction), the Y direction (Y-axis direction) and the Z direction (Z-axis direction). The pass direction vector VP2 of the pass point P2 is set as a unit vector represented by (1, 0, 0) in the relative coordinate system 202. In the pass point P3, the pass direction vector VP3 is set as a unit vector parallel to the pass direction of the curve L2 (harness). In this case, the pass direction vector VP3 in the relative coordinate system 202 is represented by (xv3, yv3, zv3). Therefore, the relative passing direction of the pass point P3 with respect to the pass point P2 is represented by (1-xv3, 0-yv3, 0-zv3).

The gravitational force direction is the direction of the universal gravitation, and the vector VG in the gravitational force direction is set in each of the pass points P2 and P3. In the present embodiment, the gravitational force direction vector VG is represented by the coordinates of he absolute coordinate system.

{Change of Relative Position}

Next, the "change of a relative position" used by the section comparison unit 104a in detecting a change of a harness shape in a section is described with reference to FIGS. 5A and 5B.

Figure 5A:
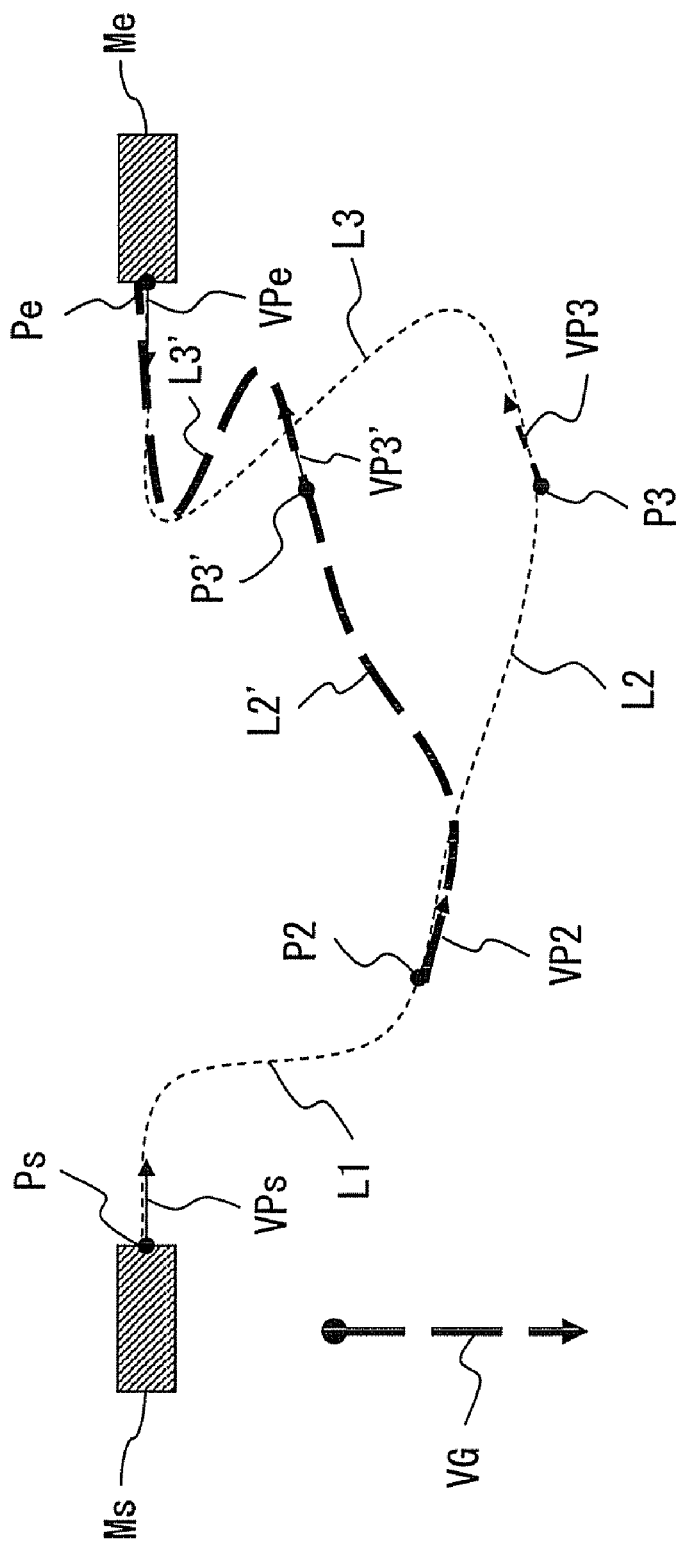
FIG. 5A is an explanatory view of the "difference in relative position" used by the section comparison unit in detecting a change in harness shape of a section.

FIG. 5A is an example of connecting a part (model) Ms to a part (model) Me through a harness. In FIG. 5A, the curve of the broken line refers to the route of the harness before the change, and the curve of the solid line refers to the route of the curve after the change. In this example, the starting point Ps of the harness is set on the part Ms, and the endpoint Pe of the harness is set on the part Me. In addition, the pass points P2 and P3 are set in order from the starting point of the harness as the pass points between the starting point Ps and the end point Pe of the harness. The section between the starting point PS and the pass point P2 is defined as a section 1, the section between the pass points P2 and P3 is defined as a section 2, and the section between the pass point P3 and the end point Pe is defined as a section 3.

In this example, the position of the pass point P3 is changed. In FIG. 5A, the pass point P3 after the change is expressed by pass point P3'. As a result of the change of the position of the pass point P3, the route shapes of the section 2 and the section 3 are changed in the harness connecting the starting point Ps and the end point Pe. That is, the shapes of the curve L2 of the harness of the section 2 and the curve L3 of the harness of the section 3 change. In this example, the pass direction VP3 of the pass point P3 is the same as the pass direction VP' of the pass point P3', and the pass direction does not change in the section 3. Also in this example, the gravitational force direction VG does no change.

FIG. 5B illustrates the values before and after the changes of the "relative position (X, Y, Z)", "relative passing direction (Rx, Ry, Rz)", and "difference from the gravitational force direction" of the route of the harness in the section 2. As illustrated in FIG. 5B, the relative position of the pass point P3 changes after the change, but the relative passing direction and the difference from gravitational force direction do not change after the change. In this case, as a result of the change of the position of the pass point P3 in the positive direction of Y, the relative position of the pass point P3 is changed from (25, −5, 0) to (25, 20, 0). The section comparison unit 104a detects the change of the relative position of the pass point P3 according to the pass point position information received from the pass point management unit 103. Although FIG. 5B illustrates only the section 2, the relative position changes also in the section 3 as in the section 2, and the change is detected by the section comparison unit 104a.

{Change of Relative Passing Direction}

Figure 6A:
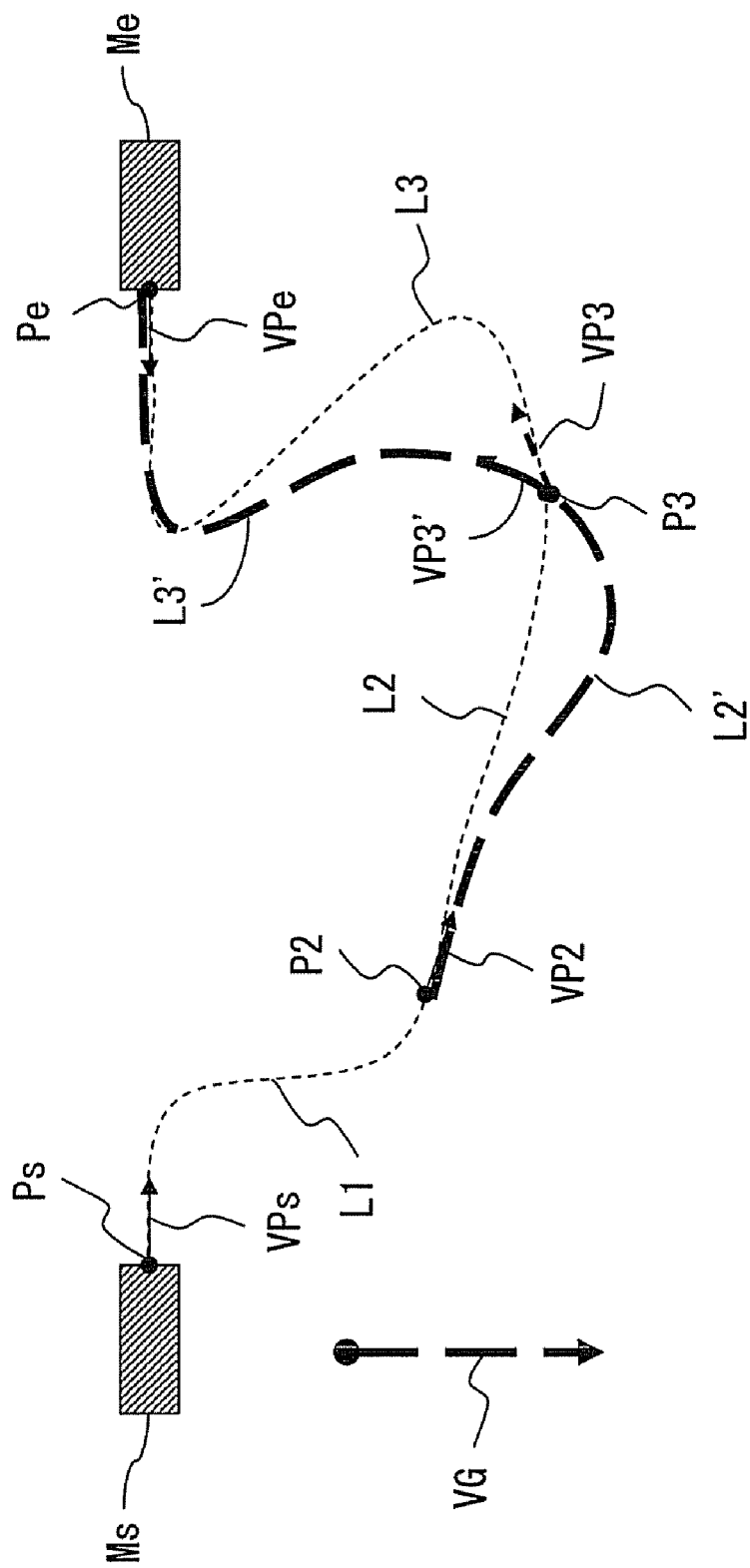
FIG. 6A is an explanatory view of the "difference in relative passing direction" used by the section comparison unit in detecting a change in harness shape of a section.

Next, the "change of the relative passing direction" used by the section comparison unit 104a in detecting the change of a harness shape of a section is described with reference to FIGS. 6A and 6B. In FIG. 6A, the same component as that illustrated in FIG. 5A is assigned the same reference numeral.

In the example illustrated in FIG. 6A, the position of the pass point P3 is not changed, but the pass direction at the pass point P3, that is, the pass direction vector VP3, is changed. By changing the pass direction vector VP3, the shapes of the route L2 of the harness of the section 2 and the route L3 of the harness of the section 3 are changed. That is, as illustrated in FIG. 5A, the route of the section 2 is changed from L2 to L2', and the route of the section 3 is changed from L3 to L3'. In this example, the gravitational force direction VG is not changed.

FIG. 6B illustrates the "relative position", the "relative passing direction", and the "difference from the gravitational force direction". As illustrated in FIG. 6B, the parameter that changes after the change in the section 2 is only the "relative passing direction". In this case, the pass direction (pass direction vector VP3) rotates in the Y direction on the X-Y plane. As a result, the relative passing direction (Rx, Ry, Rz) of the section 2 changes from (0.86, 0.52, 0) to (0.62, 0.86, 0). The section comparison unit 104a detects the change on the basis of the position information about the pass point received from the pass point management unit 103. In FIG. 6B, as in FIG. 5B, only the values before and after the changes of the "relative position", the "relative passing direction", and the "difference from the gravitational force direction" are illustrated, but the value of the relative passing direction VPe of the end point Pe is changed with the change of the pass direction vector VP3 in the section 3.

{Difference from the Gravitational Force Direction}

Although there is no change in the "relative position" and the "relative passing direction" between the starting point pass point and the end point pass point of a section, the shape of the harness in the section is changed by the influence of gravity. Therefore, it is necessary to detect a change in the pass direction of a pass point in the absolute coordinate system. Accordingly, in the present embodiment, the concept (parameter) of the "difference from the gravitational force direction" is introduced, and the shape of a harness of a section is generated (changed) with the difference from the gravitational force direction taken into account. The difference from the gravitational force direction refers to the difference between the pass direction of a pass point (pass direction vector) and the gravitational force direction (gravitational force direction vector) in the absolute coordinate system. In the present embodiment, the section comparison unit 104a detects the difference from the gravitational force direction with respect to the starting point pass point of each section, and regenerates the shape of a section when the difference is equal to or higher than a predetermined value. The pass point for detection of a difference from the gravitational force direction can be an end point pass point of a section, not a starting point pass point of the section.

Figure 7A:
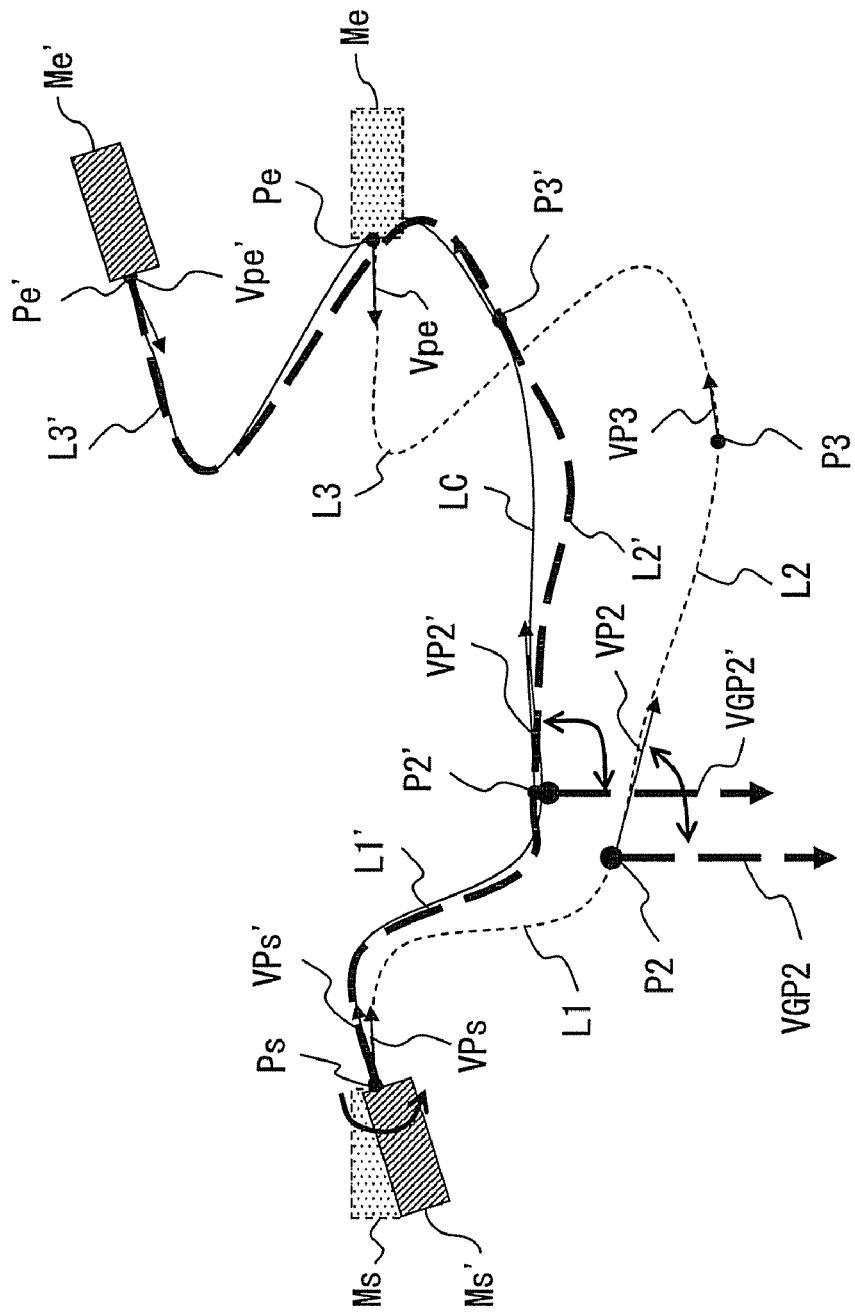
FIG. 7A is an explanatory view of the "difference from gravitational force direction" used by the gravitational force direction comparison unit in detecting a change in harness shape of a section.

The difference from the gravitational force direction is described below in detail with reference to FIGS. 7A and 7B. In FIG. 7A, the same component as that illustrated in FIG. 5A is assigned the same reference numeral.

In the example in FIG. 7A, the part Ms is rotated by centering the pass point (starting point) Ps. In FIG. 7A, to identify the part Ms between before and after a change, the part before the change is represented by Ms and the part after the change is represented by Ms'. With the rotation of the part Ms, the shape of the harness connecting the part Ms and the part Me changes over the section 1 through the section 3. That is, the route of the harness of the section 1 changes from L1 to L1', the route of the harness of the section 2 changes from L2 to L2', and the route of the harness of the section 3 changes from L3 to L3', thereby changing the shape of each route. The curve LC connecting the starting point Ps and the endpoint Pe illustrated in FIG. 7A is a curve indicating the route of the harness when the influence of gravity is not considered.

In the present embodiment, the relative position and the relative passing direction between the pass points are not changed after a change. However, the difference from the gravitational force direction changes. If the section 2 illustrated in FIG. 7A (section between the pass points P2 and P3) is checked, the difference of the starting point pass point P2 in the gravitational force direction in the section 2 changes after the change. That is, as illustrated in FIG. 7B, the difference (Rx, Ry, Rz) in the gravitational force direction at the starting point pass point P2 changes from (0.5, −0.85, 0) to (0.0, −1.0, 0). Thus, in the present embodiment, the "difference from the gravitational force direction" of each section can be detected by detecting the "difference from the gravitational force direction" of a starting point pass point. The "difference from the gravitational force direction" of a section can be detected by detecting the difference from the gravitational force direction of the endpoint pass point, not the starting point pass point.

{Outline of the Method of Detecting a Changed Portion}

The generation of the shape of a harness according to the present embodiment is based on the method of generating the shape of a harness according to the invention (International Application Number PCT/JP2007/50189) filed for application previously by the inventor of the present application, and the method of setting the "pass point" and the "pass direction"

used in the present embodiment is described in detail in the specification and the attached drawings of the invention of PCT/JP1007/50189.

In the embodiments of the present invention, a pass point is set between the start point and the end point of a harness. The starting point and the end point are also pass points. Each pass point is provided with "coordinates" and a "pass direction". As described above with reference to FIG. 4, the coordinates of a pass point are those in the relative coordinate system (three-dimensional orthogonal coordinate system) having the previous pass point as an origin. The X axis of the relative coordinate system is set to match the pass direction (pass direction vector) of the pass point as the origin. The Y axis of the relative coordinate system is set as the normal direction (normal vector) of the specified surface of the part corresponding to the pass point of the origin. The unit vector of the Z axis of the relative coordinate system is equal to the outer product of the unit vector of the X axis (pass direction vector) and the unit vector of the Y axis (normal vector).

In the present embodiment, a changed portion of a harness is designated in the following procedure.
1. A change of a pass point (changes of the position and the posture (direction) in the absolute coordinates) is detected.
2. A harness corresponding to the detected pass point is selected.
3. The portion for which a change is required in the selected harness (hereinafter referred to as a changed portion) is designated.

In designating the changed portion, a "starting point", an "end point", a "pass direction", and a "gravitational force direction" are verified in each section of a harness. The verification is performed in the procedure (1) through (3). In this example, the section 2 in FIG. 4 is described to explain the procedure (1) through (3).
(1) The position and the pass direction of the pass point P3 (pass point at the end point of the section 2) are changed from the absolute coordinate system into the coordinates of the relative coordinate system using the pass point P2 (pass point at the starting point of the section 2) as the origin.
(2) The above-mentioned coordinates change result are compared with the relative position of the pass point P3 before the change with the relative passing direction.
(3) When a change of the gravitational passing direction is to be verified (when there is no change in the relative position and the pass direction of the pass point P3 in the verification in (2)), the value representing the gravitational force direction (gravitational vector) by the above-mentioned relative coordinate system set at the pass point 2 is compared between the value before a change and the value after the change.

If it is determined that the result of the comparison (difference between the values before and after the change) is equal to or larger than a predetermined value in the procedure (1) through (3), then the process of changing the curve and the shape of the harness is performed.

{Section Shape Management Unit}

In the present embodiment, a harness is divided into a plurality of sections in the direction from the starting point to the end point, and manages the shape of the harness in each section. The management is performed by the section shape management unit 106.

Figure 8:
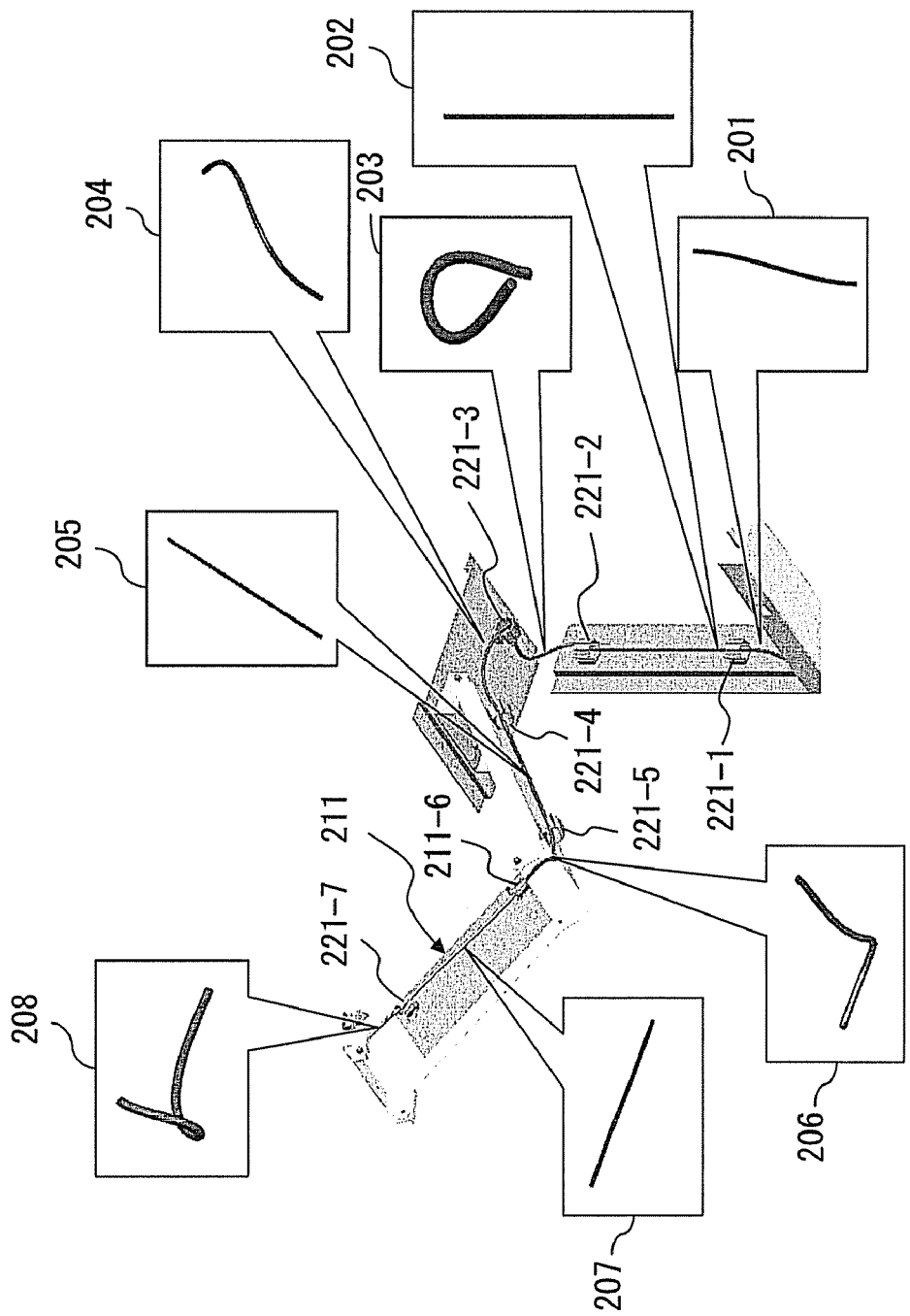
FIG. 8 illustrates an example of the section shape management unit managing a harness for each section.

FIG. 8 is an example of the section shape management unit 106 managing a harness for each section. In the example in FIG. 8, one harness 211 is managed after divided into eight sections of a section 201 (section 1) through a section 208 (section 8). The shape in the rectangular blown-off frame corresponding to each section indicates the shape of the harness in the corresponding section.

The section 201 is positioned between the starting point Ps (pass point 1 (not illustrated in the attached drawings)) and the pass point P2 (not illustrated in the attached drawings), and the pass point P2 is set at the position corresponding to a clamp part 221-1. The section 202 has the pass point P2 as a starting point and the pass point P3 (not illustrated in the attached drawings) as an endpoint. The pass point P3 is set at the position corresponding to a clamp part 221-2.

Similarly, the pass points P4 (not illustrated in the attached drawings) through P8 (not illustrated in the attached drawings) are set corresponding to the clamp parts 221-3 through 221-7 respectively. Then, the section 202 is set between the pass points P2 and P3, the section 203 is set between the pass points P3 and P4, the section 204 is set between the pass points P4 and P5 (not illustrated in the attached drawings), the section 205 is set between the pass points P5 and P6 (not illustrated in the attached drawings), the section 206 is set between the section P6 and P7 (not illustrated in the attached drawings), the section 207 is set between the sections P7 and P8 (not illustrated in the attached drawings), and the section 208 is set between the sections P2 and the end point Pe (not illustrated in the attached drawings).

The section shape management unit 106 individually manages one harness 211 illustrated in FIG. 8 for each of the sections 201 through 208. The management is performed using the table (section shape management table) held by the section shape management unit 106.

FIGS. 9A and 9B are examples of the configuration of the section shape management table held by the section shape management unit 106.

A section shape management table 106a illustrated in FIG. 9A manages the section shape of the harness 211 illustrated in FIG. 8. The harness 211 illustrated in FIG. 8 is configured by the sections 1 through 8. Therefore, the section shape management table 106a corresponding to the harness 211 stores the shape management information about the entire sections 1 through 8 of the harness 211, but FIG. 9A illustrates only a part (only the shape management information about the sections 1 through 3) of the section shape management table. FIG. 9B illustrates the details of the shape management information about the section 3 stored in the section shape management table.

The section shape management table 106a stores the shape management information about the sections 1 through 3 of the harness 211 in the format illustrated in FIG. 9A. As described above, the section shape management table 106a actually stores the shape management information about the sections 1 through 8.

As described above, the shape of the harness of each section is generated on the basis of the relative coordinate system having a starting point pass point as an origin. The section shape management table 106a illustrated in FIG. 9A manages the shape of the harness of the sections 1 through 3 by the three items of "section", "starting point pass point", and "shape". The starting point pass point of the section 1 is the pass point P1 (starting point Ps), and with regard to the section 1, the relative coordinate system having the pass point P1 as an origin is set. The X axis of the relative coordinate system is set in the direction parallel to the pass direction of the harness at the pass point P1. Then, the Y and Z axes are set on the plane including the origin. The shape item of the section 1 stores harness shape data 231 of the section 1 as illustrated in FIG. 9A. The starting point pass point of the section 2 is a pass point P2, and the starting point pass point of the section 3 is the pass point P3. The shape items corresponding to the sections 2 and 3 of the section shape management table 106a respectively stores harness shape data 232 and 233.

FIG. 9B illustrates the harness shape data of the section 3 stored in the section shape management table 106a. As illustrated in FIG. 9B, the relative coordinate system having the pass point P3 as an origin is set at the pass point P3 as the starting point pass point of the section 3, and the harness shape data 233 between the starting point pass point P3 and the end point pass point P4 is set.

[Operation]

Described below is the operation of the design support device 100 with the above-mentioned configuration according to the present embodiment. The process of the central portion of the present invention is described below.

{Gravitational Consideration Flag Setting Process}

Figure 10A:
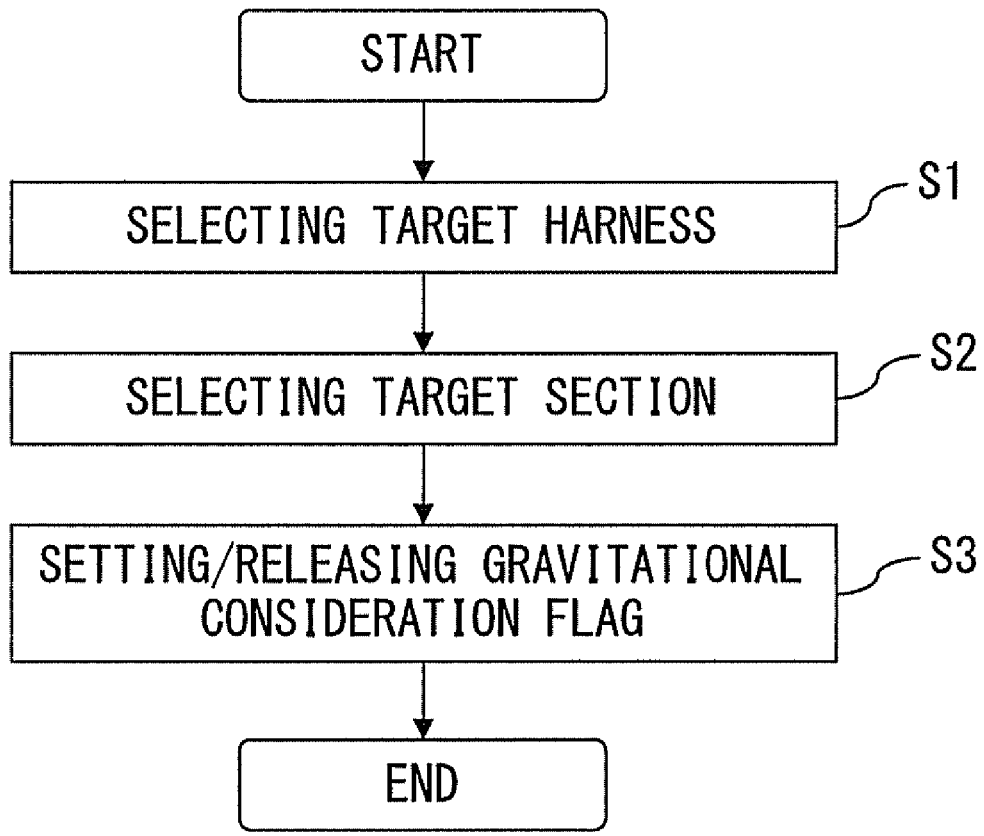
FIG. 10A is a flowchart of the procedure of the gravitational consideration flag setting process performed by the harness management unit.

The harness editing unit 101 receives user input information from the input device 120 when a user changes an existing harness design model through the input device 120, and performs the "gravitational consideration flag setting process" illustrated in FIG. 10A according to the input information.

FIG. 10A is a flowchart of the procedure of the gravitational consideration flag setting process performed by the harness editing unit 101. The process of the flowchart is performed on the basis of the instruction of the user input on the GUI (graphical user interface) screen displayed on the screen of the display device 130.

The harness editing unit 101 first selects one harness for which a gravitational consideration flag is to be set according to the user input information received from the input device 120 (S1). Next, with respect to the selected harness, a section to be changed in the gravitational force direction is selected according to the user input information received from the input device 120 (S2). One section or a plurality of sections can be selected. Finally, with respect to each section selected in step S2, the gravitational consideration flag is set or released according to the user input information received from the input device 120 (S3).

By performing the process above, the gravitational consideration flag is set or released for the entire sections of the harness selected by the user on the basis of the operation of setting the gravitational consideration flag specified by the user through the input device 120 on the GUI screen displayed on the screen of the display device 130.

The harness editing unit 101 manages the gravitational consideration flag set or released as described above using, for example, the gravitational consideration flag management table illustrated in FIG. 10B.

A gravitational consideration flag management table 101a illustrated in FIG. 10B stores the information about "setting" or "releasing" the gravitational consideration flag for the entire sections 1 through n of one harness. The harness editing unit 101 generates and stores the gravitational consideration flag management table in the format illustrated in FIG. 10B for all harnesses selected by the user. The gravitational consideration flag is referred to in the harness shape generating process described later.

{Entire Process Flow of Changing a Harness}

Figure 11A:
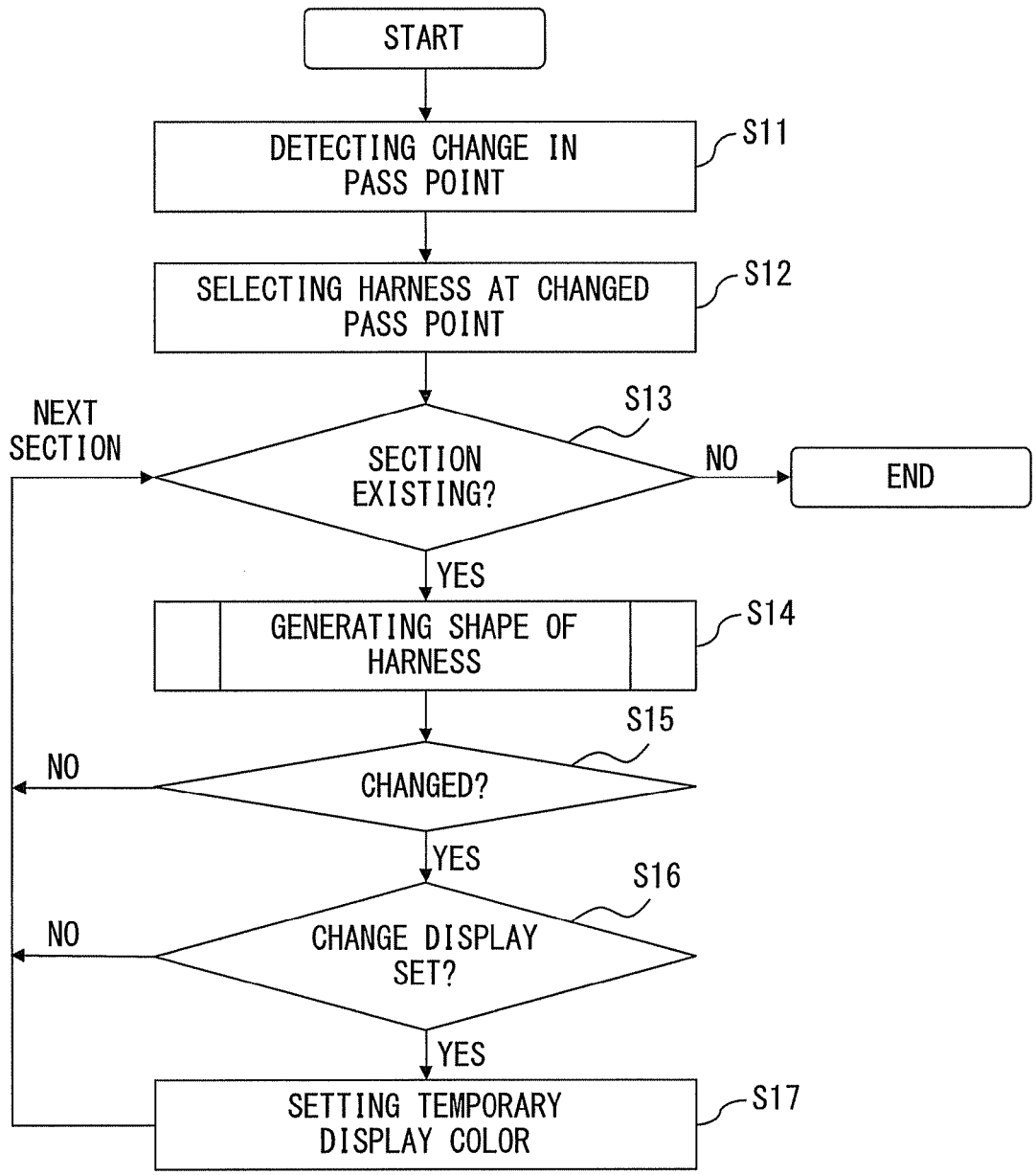
FIG. 11A is a flowchart illustrating the entire flow of the harness changing process performed by the design support device according to an embodiment of the present invention.

FIG. 11A is a flowchart of the entire process of changing a harness performed by the design support device 100 according to the present embodiment. The process according to the flowchart is performed by the CPU (central processing unit) in the design support device 100 executing the program (design support program) loaded into the main memory.

Described below is the flowchart in FIG. 11A.

First, the position and the posture (direction) of a pass point in the absolute coordinate system are checked, and the pass point for which one of the two pieces of the information has been changed is detected (S11). Next, the harness of the pass point (changed pass point) detected in step S1 is selected (S12). Then, in the subsequent steps, it is checked whether or not there is any route change in the entire section of the harness selected in step S12 (hereinafter referred to as a "selected harness"), and a curve/shape generating process etc. is performed for a route changed section.

After a harness is selected in step S12, the first section (section 1) of the harness is selected next (S13). Then, the "harness shape generating process" is performed for the selected section (section 1 in this case) (S14). The harness shape generating process is described later in detail, but in this process, a change in the above-mentioned "relative position", "relative passing direction", and "difference from the gravitational force direction" is checked, and if any of the three types of parameters above is equal to or exceeds a predetermined value, then the "changed portion flag" is set in the ON position.

When the process in step S14 is completed, the changed portion flag is checked, and it is determined whether or not there is a change of a harness shape in a target section (section 1 in this case) on the basis of the flag (S15). In the determination, if the changed portion flag is set in the ON position, it is determined that the harness shape in the target section has been changed, and control is passed to step S16. On the other hand, if the changed portion flag is set in the OFF position, it is determined that there is no change in the harness shape in the target section, and control is returned to step S13.

In step S16, it is determined whether or not a change display is set in the target section. A change display for each section is set by user through the input device 120. If it is determined in step S16 that a change display is set in a target section (a change display has been set), then control is passed to the next step S17. On the other hand, if it is determined that there is no change display in a target section (no change display has been set), control is returned to step S13.

In step S17, a target section in which the harness shape has been changed is temporarily displayed in a color different from the color of the section in which the harness shape has not been changed. A display example is described later. When the process in step S17 is completed, control is returned to step S13.

In the second step S13, the next section after the above-mentioned selected harness is selected. In this case, when there is the section 2, the section 2 is selected, and the section 2 is a new target section. For the section 2, the process similar to the process for the above-mentioned section 1 is performed in and after step S13.

Thus, the processes in steps S14 through S17 are performed on the entire sections on the selected harness until it is determined in step S13 that there is no more target section in the selected harness. If it is determined in step S13 that there is no more target section in the selected harness, the process of the present flowchart is terminated.

{Harness Shape Generating Process}

Figure 11B:
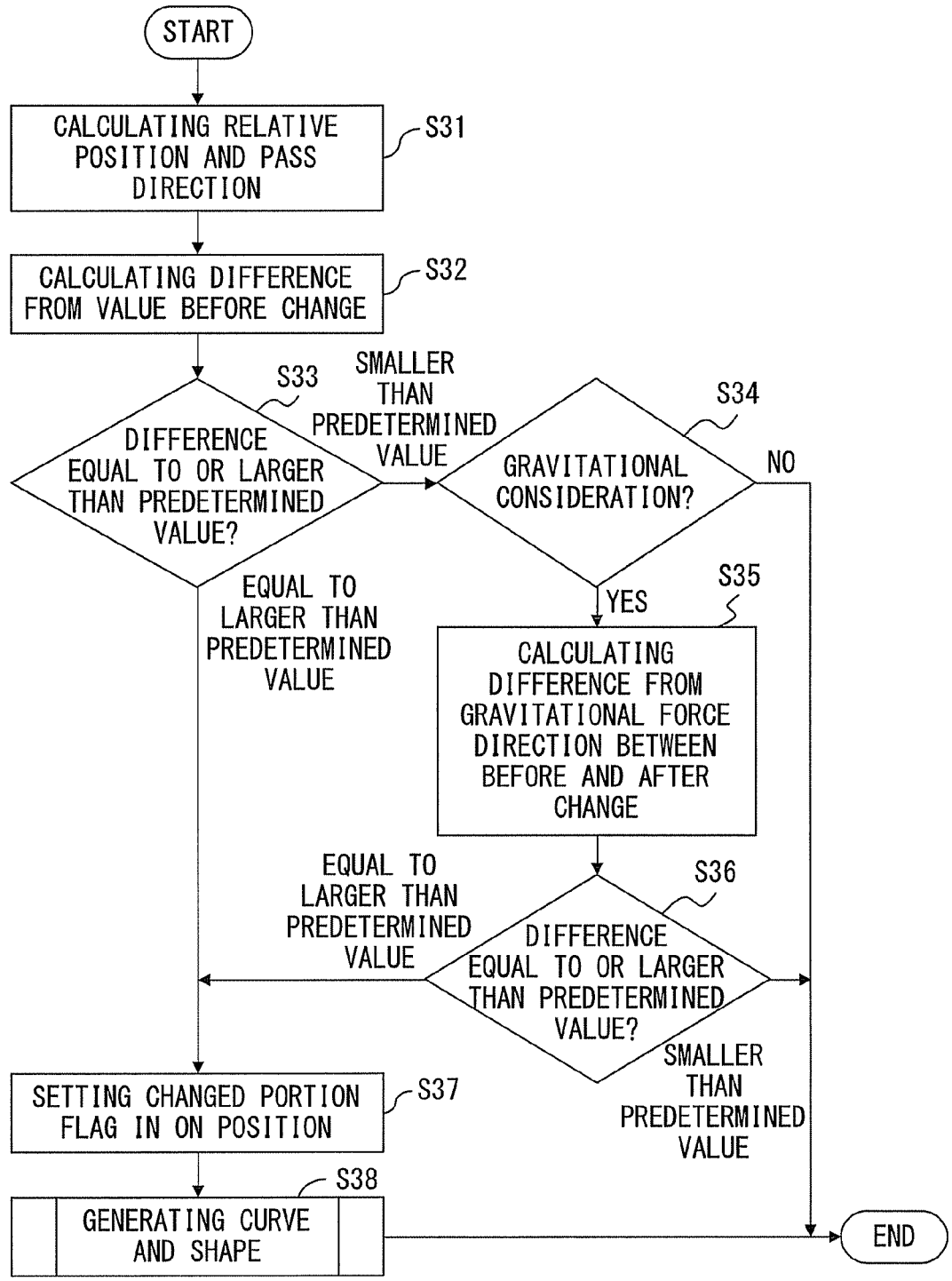
FIG. 11B is a flowchart illustrating in detail the harness shape generating process in FIG. 11A.

Next, the details of the "harness shape generating process" in step S14 in FIG. 11A is described with reference to FIG. 11B. FIG. 11B is a flowchart of the detailed process flow of the harness shape generating process. The process is performed by the comparison unit 104 and the generation unit 105.

First, the "relative position" and the "relative passing direction" before and after a change in the target section are calculated (S31). In step S31, when the "relative position" and the "relative passing direction" of the target section before the change are stored in memory etc., only the "relative position" and the "relative passing direction" after the change are calculated.

Next, with respect to the "relative position" and the "relative passing direction" of the target section, the difference between a value after a change and a value before the change is calculated (S32). It is determined whether or not the difference is equal to or larger than a predetermined value (S33). If it is equal to or larger than the predetermined value, control is passed to step S37. On the other hand, if it is smaller than the predetermined value, control is passed to step S34.

In step S34, the gravitational consideration flag of the target section is checked, and it is determined whether or not gravity is to be considered. In the determination, it is determined that gravity is to be considered if the gravitational consideration flag of the target section is set in the ON position, and it is determined that gravity is not to be considered if the gravitational consideration flag of the target section is set in the OFF position. If it is determined in step S34 that it is necessary to consider gravity, then control is passed to step S35. If it is determined that it is not necessary to consider gravity, the process of the present flowchart is terminated.

In step S35, the difference between the "differences from the gravitational force direction" before and after the change is calculated. Then it is determined (S36) whether or not the difference is equal to or exceeds a predetermined value. If it is equal to or larger than the predetermined value, control is passed to step S37. If it is smaller than the predetermined value, the process in the present flowchart is terminated.

In step S37, the "curve/shape generating process" for generating the curve and the shape of the route in a target section is performed, the curve of the route in the target section is generated, and then on the basis of the curve, the shape of the route in the target section is generated. The curve/shape generating process is described later in detail.

As described above, in the present embodiment, the difference of the "relative position", "relative passing direction", and "difference from the gravitational force direction" after a change is calculated. If any of the three parameters has a difference equal to or larger than a predetermined value, then the shape of the route of the target section is generated. On the other hand, if differences after the change of all of the three types of parameters are smaller than the predetermined value in the target section, no shape of route is generated for the target section. Thus, the harness shape generating process for the harness whose shape is changed can be limited to a necessary section, thereby shortening the harness shape generating time.

{Curve/Shape Generating Process}

Figure 11C:
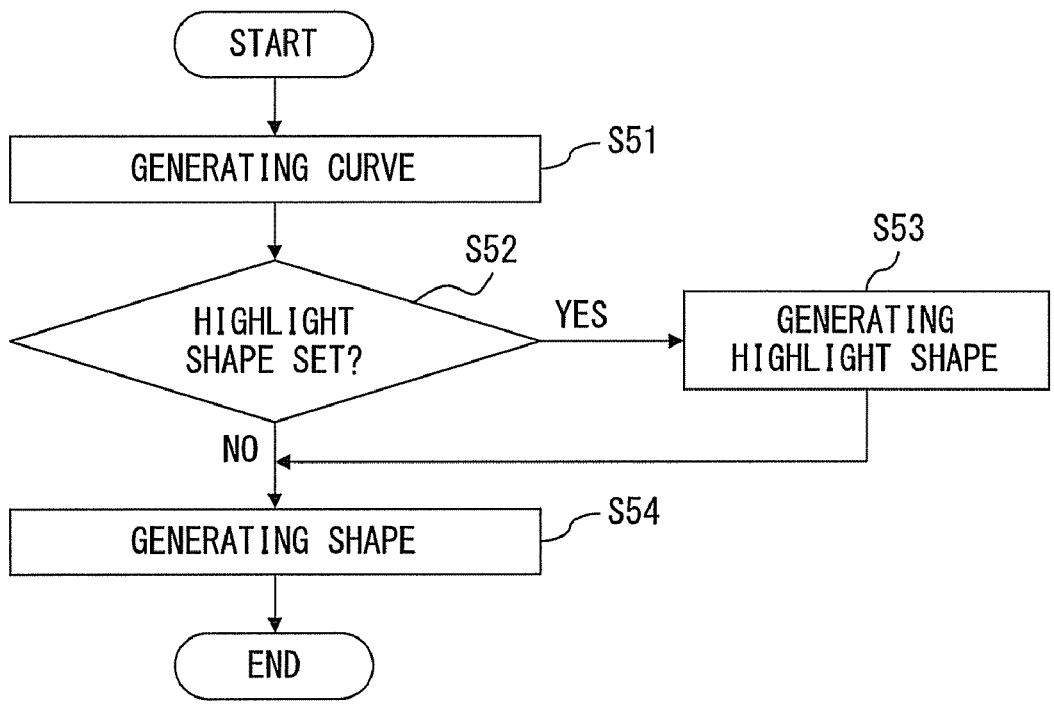
FIG. 11C is flowchart illustrating in detail the curve/shape generating process in FIG. 11B.

Next, the details of the "curve/shape generating process" in step S38 in FIG. 11B is described below with reference to FIG. 11C. FIG. 11C is a detailed flowchart of the curve/shape generating process. The process is also performed by the curve generation unit 105a and the shape generation unit 105b of the generation unit 105.

First, a curve is generated in the target section (S51). Then, it is determined whether or not a highlight shape is set for the target section (S52). The highlight shape is set through, for example, the input device 120 by user. The setting information is managed by the harness editing unit 101 using a flag etc. If it is determined in step S52 that a highlight shape is set in a target section, the highlight shape of the route of the target section is generated (S53). Then, control is passed to step S54. On the other hand, if it is determined in step S52 that a highlight shape is not set in the target section, control is immediately passed to step S54.

In step S54, a normal shape of the route in a target section is generated (S54), and then the process of the present flowchart is terminated.

Thus, the shape of the route in the target section is generated in the order of curve generating and shape generating. In this case, during generating a shape, a highlight shape (shape displayed with highlight) is generated in a section in which a highlight shape is set so that the section can be identified from a section in which a highlight shape is not set. For the section in which a highlight shape is to be set, both a highlight shape and a normal shape are generated so that the user can switch and select between the highlight shape display and the normal shape display. An example of a highlight display of a section in which a highlight shape is set is described later. In the section in which a highlight shape is not set, only a normal shape is generated.

[Shape Display of Harness]

The design support device 100 provides two modes of "normal display" and "highlight display" as the display modes of a harness. The display modes are described below.

{Display of Harness before Change (Normal Display)}

Figure 12:
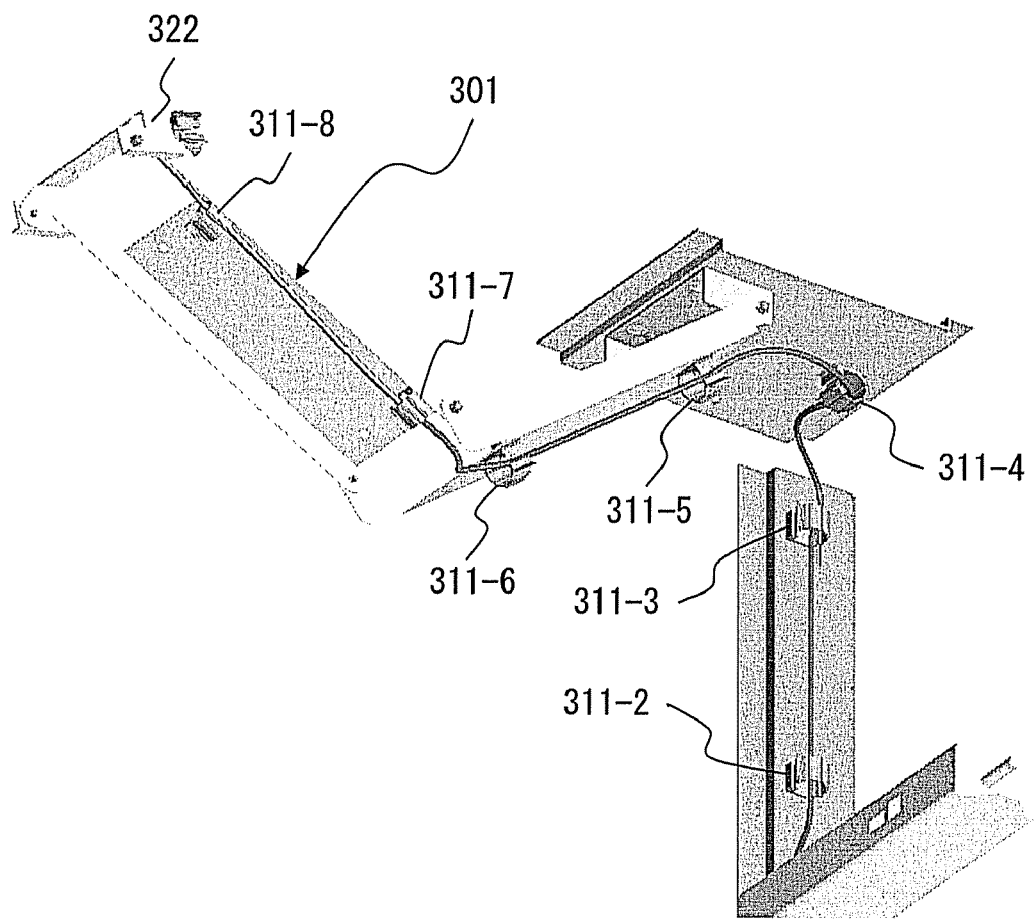
FIG. 12 is an example of displaying a generated harness (before a change) displayed by the section shape display unit on the screen of a display device.

FIG. 12 is an example of the section shape display unit 107a displaying a generated harness (harness before a change) displayed on the screen of the display device 130.

In displaying the harness illustrated in FIG. 12, one harness 301 for connecting a first connector (not illustrated in the attached drawings) to a second connector 322 is displayed in the same color and shape in all sections. The harness 301 is clamped by clamp parts 311-2 through 311-8 between the first connector and the second connector 322.

Figure 13:
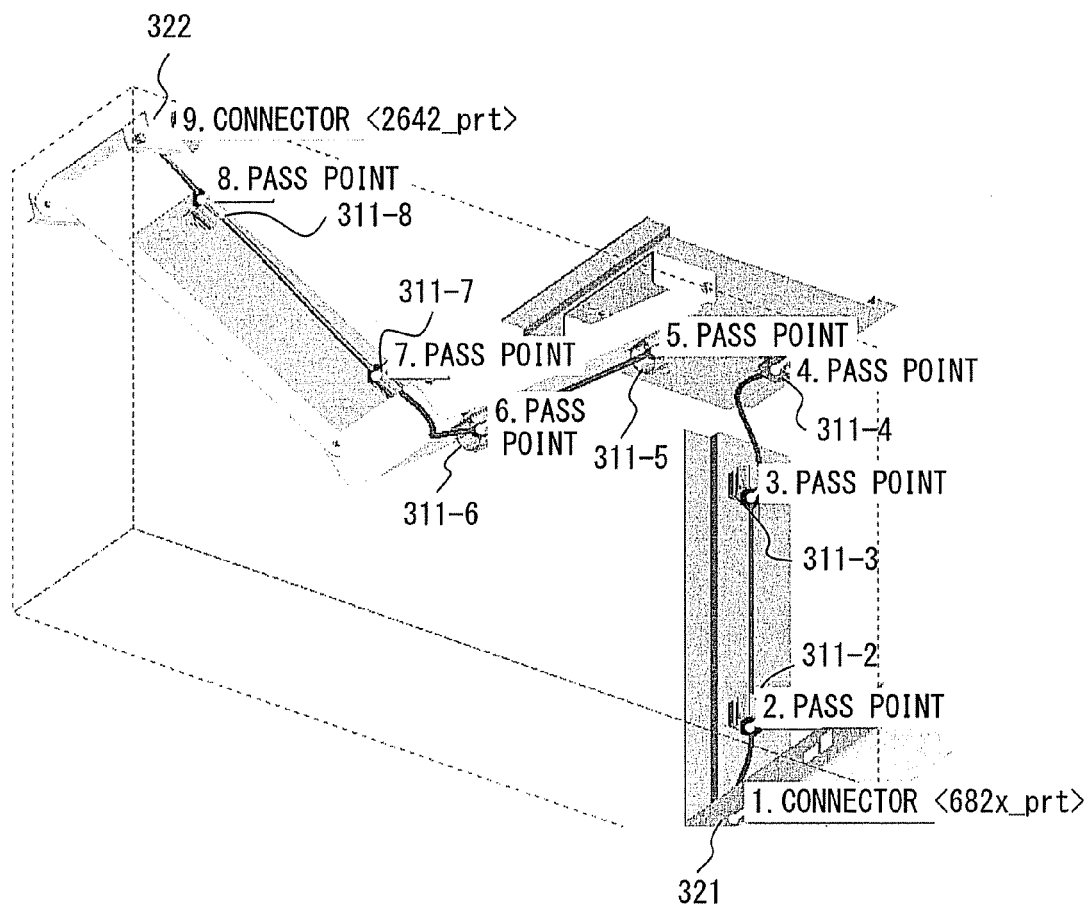
FIG. 13 is another example of displaying a generated harness displayed by the section shape display unit on the screen of a display device.

FIG. 13 is another example of the section shape display unit 107a displaying a generated harness displayed on the screen of the display device 130. In FIG. 12, the same component as in FIG. 13 is assigned the same reference numeral. In displaying the screen illustrated in FIG. 13, the first connector is hidden by a part and its shape is not displayed, but it is represented as a first connector 321 for convenience.

In displaying the generated harness illustrated in FIG. 13, a pass point is displayed. A connector for connecting the starting point to the endpoint of a harness is also displayed. For the connector, the part name "connector" is displayed. For the pass point, the name "pass point" is displayed near the corresponding clamp parts 311-2 through 311-8. In displaying the "pass point", the numbers (pass point numbers) "2" through "8" are displayed as the leading items in the order from the first connector 321 as the starting point of the harness 301 to the second connector 322 as the end point. For the first connector 321, "1" indicating the starting point (pass point 1) is displayed. For the second connector 322, "9" indicating the end point (pass point 9) is displayed.

The display of a harness in FIGS. 12 and 13 is also a normal display of the harness.

{Highlight Display}

FIGS. 14A and 14B are examples of highlight display of a harness displayed on the screen of the display device 130 by the section shape display unit 107a. In the highlight display, the section in which the shape has been changed is highlighted for display so that the section in which the shape has been changed and the section in which the shape has not been changed can be easily identified by a user. In FIGS. 14A and 14B, the same component as in FIG. 12 is assigned the same reference numeral.

In the highlight display illustrated in FIG. 14A, the section in which the shape has been changed and the section in which the shape has not been changed can be identified by display color. Practically, the sections L4, L6, and L8 in which the shape has been changed are displayed in yellow, and the sections L1, L2, L3, L5, and L7 in which the share has not been changed are displayed in green (same color as the normal display).

In the highlight display illustrated in FIG. 14B, the section in which the shape has been changed and the section in which the shape has not been changed can be identified also by changing the thickness of the shape in addition to the display color. Practically, the sections L4, L6, and L8 in which the shape has been changed are displayed in bold yellow, and the sections L1, L2, L3, L5, and L7 in which the share has not been changed are displayed in green (same color as the normal display) of a normal thickness. Thus, in the highlight display illustrated in FIG. 14B, the section in which the shape has been is highlighted and displayed by a combination of the display color and the shape (size of the diameter of the cross-sectional shape). The highlight display in the design support device according to the present invention is not limited to the examples in 14A and 14B, but can be variable in addition to the examples above as a display attribute for highlight display of the section in which the shape has been changed.

{Section Information Display}

The section information display unit 107b according to the present embodiment displays on the screen of the display device 130 various types of section information (length, cross-sectional shape, size, etc.) about the data before and after the change with the user operation for the input device 120 for the section in which the shape of the harness is changed.

An example of displaying section information is described below with reference to FIG. 15. In FIG. 15, the same component as in FIG. 14A is assigned the same reference numeral.

In the example illustrated in FIG. 15, when the user brings a cursor 401 close to a section L6 in which the shape has been changed, section information 403 about the section L6 is displayed. The section information 403 includes a section number ("6" in this example), the diameter of the harness of the section L6 (4 mm in this example), the wire length of the section L6 before the change (65 mm in this example), and the wire length of the section L6 after the change (60 mm in this example). The user can be easily and immediately informed that the wire length of the section L6 has been shortened from 65 mm to 60 mm by checking the display contents of the section information 403. The contents of the section information about the changed section displayed by the design support device of the present invention are not limited to the example illustrated in FIG. 15. For example, they can be various types of information about the cross-sectional shape, size, etc. of the harness in a changed section.

[System Configuration of Computer for Realizing Design Support Device According to the Present Embodiment]

The design support device 100 according to the above-mentioned present embodiment can be realized as a program (design support program) operated by a computer.

FIG. 16 is an example of the configuration of the system of the computer for executing the design support program.

A computer 500 illustrated in FIG. 16 is provided with a body 501, a display 502, a keyboard 503, a mouse 504, and a communication device 505. The body 501 includes a CPU, a BIOS chip set, a memory, a USB (universal serial bus) port, a serial port, a parallel port, a storage device such as a hard disk device, etc., a drive for magnetic storage media such as a floppy (registered trademark) disk etc., a drive for optical storage media such as a CD, a DVD, etc., a drive for magneto optical storage media such as a MO etc., a NIC (net interface card), etc. The display 502 inputs display data and a control signal from the display control unit of the body 501, and displays a GUI (graphical user interface) screen, a design screen, etc. The keyboard 503 is used by a user inputting a command and data to the body 501. The mouse 504 is used in specifying an optional position of the design model displayed on a screen 502a of the display 502, and specifying and moving a part of the design model. The communication device 505 is used to access an external server etc. through a network 600 such as a WAN (wide area network), a LAN (local area network), etc. and download a design support program etc. of the present embodiment from the computer of the server etc., and can be a network communication card, a modem, etc. The design support program according to the present embodiment is stored in a portable storage medium 610 that can be read by the computer 500 including a magnetic disk such as a floppy (registered trademark) disk etc., an optical disk such as CD-ROM, a DVD, etc., an IC card memory, etc. In this case, the design support program can be installed on the storage device of the network 600 by attaching the portable storage medium 610 to the corresponding drive of the body 501. It is also possible for the CPU of the body 501 to execute the design support program with the portable storage medium 610 attached. The design support program according to the present embodiment can also be executed by the CPU of the body 501 by downloading the program from the computer of the server etc. connected over the network 600 through the communication device 105 as described above.

According to the present embodiment as described above, the portion in which the shape is to be regenerated is limited for each section by the processes of (1) through (3) below when the shape of a harness is changed. Therefore, the process of changing the shape of a harness can be performed in a higher speed. Actually, as a result of applying the design support device according to the present embodiment, the time required to change the shape of a harness can be shortened to ⅕ of the time required by the conventional device.

(1) Relating to the pass point of a harness, the distance between adjacent pass points is defined as a "section", and a shape is modeled for each section.
(2) When the shape of a harness is changed, the shape is regenerated only for the section in which the shape has been changed.
(3) When the entire harness is moved, and if there is no change in the relative positions of the starting point pass point and the end point pass point of each section, the above-mentioned movement can be processed by changing only the positions and the pass directions of the starting point pass point and the end point pass point of the section without regenerating the shape of each section.

Although there is no change in the relative position and the relative passing direction between the starting point pass point and the endpoint pass point in a section, the shape of a harness is changed by the influence of gravity when there occurs a change in the pass direction of the pass point in the absolute coordinate system. In the present embodiment, a change of a difference from the previous gravitational force direction is checked on the starting point pass point of each section of a harness, and the shape is regenerated for the section in which the change is equal to or exceeds a predetermined value. Thus, the shape model of a harness can be more correct than ever.

The present invention is not limited to the above-mentioned embodiments, but can be varied within the scope of the gist of the present invention. For example, in electronic equipment, the present invention can be applied for supporting the generation of the shape of a cable. In addition, it can be applied for supporting the design in generating the shape of a flexible part other than a harness or a cable, for example, the shape of the strings for the goal area of football, the shape of the strings of the nets for tennis, volleyball, etc. The present invention can also be applied for supporting the design in generating the shape of the strings for a net-shaped hammock.

The present invention can be applied for supporting the design of the shape of the strings used for the goal area of football, the strings of fiber used in an apparel field, etc. in addition to the generation of the shape of a part for connecting devices in electronic equipment such as a harness, a cable, etc., and can be widely applied for industrial uses.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing demonstration of the superiority and or and inferiority of the invention. Although the embodiment(s) of the present inventions has (have) been described in detail, it should be understood that the various changes, substitutions, and alterations could be made hereto without departing from the spirit and scope of the invention.

What is claimed is:

1. A design support device used to design a part in string or belt form, comprising:
    a main memory;
    a processor executing a program loaded into the main memory wherein the program further comprises:
        a part editing unit configured to edit a part by changing a position of a pass point through which the part passes in a virtual space; and
        a section comparison unit configured to compare a section having a plurality of consecutive pass points before the edition by the part editing unit with the sections after the edition by the part editing unit, and extracting the section in which relative positions or relative passing directions are different between two pass points in the sections, wherein
        by comparing the sections, a section in which a tangent direction of a part shape and a gravitational force direction are different after the edition in at least one pass point of the section is extracted.

2. The device according to claim 1, further comprising
    a shape generation unit configured to generate a shape in the section extracted by the section comparison unit and connect the shape to a shape of a section outside the extracted section.

3. The device according to claim 1, further comprising
    a display unit configured to change and display a display attribute of the section extracted by the section comparison unit.

4. The device according to claim 1, further comprising
    a change section display unit configured to display information about the section extracted by the section comparison unit before a change and after the change.

5. A design support method for designing a part in string or belt form, comprising:
    editing, using a CPU, a part by changing a position of a pass point through which the part passes in a virtual space; and
    comparing, using the CPU, a section having a plurality of consecutive pass points before the editing with the sections after the editing, and extracting the section in which relative positions or relative passing directions are different between two pass points in the sections, wherein
    in the comparing, a section in which a tangent direction of a part shape and a gravitational force direction are different after the edition in at least one pass point of the section is extracted.

6. The method according to claim 5, further comprising
    generating, using the CPU, a shape in the section extracted by the comparing, and connecting the shape to a shape of a section outside the extracted section.

7. A non-transitory storage medium storing a program used to direct a design support computer for designing a part in string or belt form, the program comprising:
    editing a part by changing a position of a pass point through which the part passes in a virtual space; and
    comparing a section having a plurality of consecutive pass points before the editing with the sections after the editing, and extracting the section in which relative positions or relative passing directions are different between two pass points in the sections, wherein
    in the comparing, a section in which a tangent direction of a part shape and a gravitational force direction are different after the edition in at least one pass point of the section is extracted.

* * * * *